United States Patent
Ong et al.

(10) Patent No.: US 11,516,620 B2
(45) Date of Patent: Nov. 29, 2022

(54) VEHICLE TO EVERYTHING DYNAMIC GEOFENCE

(71) Applicant: Verizon Patent and Licensing Inc., Basking Ridge, NJ (US)

(72) Inventors: Hoo Dennis Ong, Westerville, OH (US); Julie Nicole Vogelman, Sunnyvale, CA (US); Brian Peebles, Cranford, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

(21) Appl. No.: 17/156,226

(22) Filed: Jan. 22, 2021

(65) Prior Publication Data

US 2022/0046381 A1  Feb. 10, 2022

Related U.S. Application Data

(63) Continuation-in-part of application No. 16/986,187, filed on Aug. 5, 2020, now Pat. No. 11,375,344.

(51) Int. Cl.
 *H04W 4/40* (2018.01)
 *H04W 4/021* (2018.01)
 *G08G 1/16* (2006.01)

(52) U.S. Cl.
 CPC ............ *H04W 4/022* (2013.01); *G08G 1/166* (2013.01); *H04W 4/40* (2018.02)

(58) Field of Classification Search
 CPC ........ H04W 4/022; H04W 4/40; G08G 1/166; G08G 1/164
 See application file for complete search history.

(56) References Cited

U.S. PATENT DOCUMENTS

| | | | |
|---|---|---|---|
| 2013/0279392 A1 | 10/2013 | Rubin et al. | |
| 2015/0120183 A1* | 4/2015 | Annapureddy | G01C 21/362 701/430 |
| 2019/0124489 A1 | 4/2019 | Ahmad et al. | |
| 2020/0280842 A1 | 9/2020 | Liu et al. | |
| 2020/0342760 A1* | 10/2020 | Vassilovski | B60W 30/18163 |
| 2021/0061279 A1* | 3/2021 | Nagata | G08G 1/0116 |
| 2021/0280064 A1 | 9/2021 | Takla | |
| 2022/0191649 A1 | 6/2022 | El Essaili et al. | |

OTHER PUBLICATIONS

"ABI Research IoT Market Tracker", Retail 2019. 5 pages. Aug. 5, 2020. https://www.abiresearch.com/market-research/product/1033363-iot-market-tracker-retail/.

(Continued)

*Primary Examiner* — Chuong A Ngo

(57) ABSTRACT

A device may include a memory storing instructions and processor configured to execute the instructions to select a vehicle attached to a base station; determine a speed and a vehicle type associated with the vehicle; and calculate an estimated braking distance for the vehicle based on the speed and the vehicle type. The processor may be further configured to generate a geofence for the vehicle based on the calculated estimated braking distance; use the generated geofence to identify at least one relevant Vehicle-to-Everything (V2X) message to be forwarded to the vehicle; and forward the identified at least one relevant V2X message to the vehicle via the base station.

20 Claims, 13 Drawing Sheets

(56) References Cited

OTHER PUBLICATIONS

"Americas Fleet Management Markets, 2019-2023: Verizon Lead the Market, Followed by Geotab, Trimble and Omnitracs, Zonar Systems—ResearchAndMarkets.com", Nov. 12, 2019. 8 pages. https://www.businesswire.com/news/home/20191112005532/en/Americas-Fleet-Management-Markets-2019-2023-Verizon-Lead.

"FCC Seeks to Promote Innovation in the 5.9 GHz Band", Federal Communications Commission. Dec. 13, 2019. 2 pages. https://www.fcc.gov/document/fcc-seeks-promote-innovation-59-ghz-band.

"Ford Accelerates Connectivity Strategy in China: Targets Production of First C-V2X- Equipped Vehicle in 2021", Mar. 26, 2019. Shanghai, China. 3 pages. https://media.ford.com/content/fordmedia/fap/cn/en/news/2019/03/26/Ford_Accelerates_Connectivity_Strategy_in_China_And_Targets_Production_of_First_C-V2X-Equipped_Vehicle_in_2021.html.

"Georgia Department of Transportation Press Release", Georgia DOT Prepares Transportation Infrastructure for Imminent Adoption of Connected Vehicle Technology. Feb. 6, 2020. http://www.itsga.org/georgia-dot-expands-infrastructure-supporting-connected-vehicles/.

"On the road to automated mobility: An EU strategy for mobility of the future", European Commission, Brussels, May 17, 2018. 18 pages. https://ec.europa.eu/transport/sites/transport/files/3rd-mobility-pack/com20180283_en.pdf.

"Press Releases", 5G Automotive Association. Accessed May 2, 2020. 9 pages. https://5gaa.org/news/5gaa-live-demos-show-c-v2x-as-a-market-reality/.

"V2X Communications for Transportation: An Overview", US Department of Transportation. U.S. Department of Transportation. Accessed May 2, 2020. 36 pages. https://www.transportation.gov/research-and-technology/v2x-communications-transportation-overview.

Meola, "How 5G & IoT Technologies Are Driving the Connected Smart Vehicle Industry", Business Insider. Mar. 10, 2020. 11 pages. https://www.businessinsider.com/iot-connected-smart-cars.

* cited by examiner ized subscriptvehicle to everything dynamic geofence

VEHICLE TO EVERYTHING DYNAMIC GEOFENCE

CROSS-REFERENCE TO RELATED APPLICATIONS

This patent application is a continuation-in-part of U.S. patent application Ser. No. 16/986,187, entitled "VEHICLE TO EVERYTHING OBJECT EXCHANGE SYSTEM" and filed on Aug. 5, 2020, which is hereby incorporated herein by reference in its entirety.

BACKGROUND INFORMATION

A vehicle may include a computer device that collects information relating to the vehicle. For example, the computer device may collect information relating to the vehicle's location. The vehicle information may be stored for use in various telematics applications, such as, for example, vehicle tracking, navigation, or fleet management applications. Processing telematics information may pose various challenges.

DETAILED DESCRIPTION OF PREFERRED EMBODIMENTS

Figure 1:
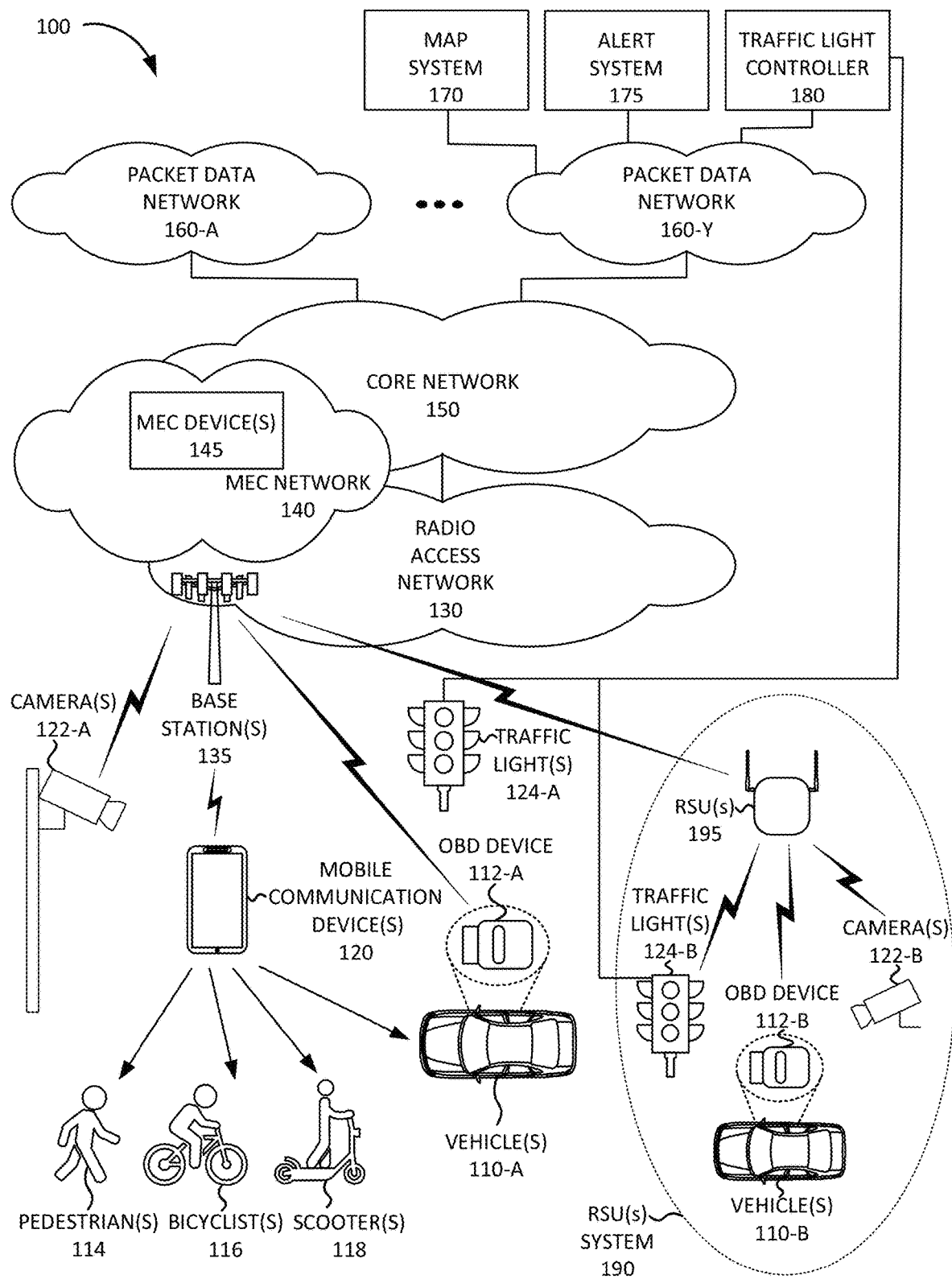
FIG. 1 illustrates an environment according to an implementation described herein.

The following detailed description refers to the accompanying drawings. The same reference numbers in different drawings identify the same or similar elements.

In order to reduce the number of road accidents and to enhance road safety, a vehicle may need to obtain information relating to what is happening in the area around the vehicle, foresee what may happen next, and take protective action. Thus, vehicles may need to be able to exchange messages with each other in order to reduce the number of collisions. Vehicle and road sensors, such as radar, lidar, and/or ultrasonic detectors may not be able to obtain information out of line-of-sight of a vehicle or outside a particular detection range. A Vehicle-to-Everything (V2X) system may include a wireless communication system that enables vehicles to share information with each other via a communication channel and may enable vehicles to receive more information about the environment and other vehicles than vehicle and/or road sensors by themselves. A V2X system may enable and/or include Vehicle-to-Vehicle (V2V) communication, Vehicle-to-Pedestrian (V2P) communication, Vehicle-to-Infrastructure (V2I) communication, and/or other types of communication associated with vehicles.

A V2X system may use wireless local area network (WLAN) technology, such as WiFi technology based on the Institute of Electrical and Electronics Engineers (IEEE) 802.11 family of standards. An example of such a system is a Direct Short Radio Communications (DSRC) system that uses the 5.9 Gigahertz (GHz) band for wireless communication. A DSRC system may send messages based on the Society of Automotive Engineering (SAE) J2735 standard, such as Basic Safety Messages (BSMs) that include location information for vehicles, Personal Safety Messages (PSMs) that include location information for pedestrians, Signal Phase and Timing (SpaT) messages that include information relating to the status of traffic lights, Roadside Alert Messages (RSAs) that include information relating to hazardous road conditions, such as ice on a bridge, Emergency Vehicle Alert (EVA) messages that announce the presence of an emergency vehicle, and/or other types of messages. Other types of WLAN based V2X systems may include an Intelligent Transport System (ITS) based on the European Telecommunications Standards Institute (ETSI) EN 302 637 standard that sends and receives Cooperative Awareness Messages (CAMs); a Driving Safety Support System (DSSS) that uses infrared beacons in combination with WLAN; and/or other types of WLAN systems.

Various municipalities and organizations have deployed a WLAN system, such as a DSRC system, locally to enhance vehicle safety. However, deploying a DRSC system requires installation of Roadside Units (RSUs). An RSU may include a WLAN transceiver that receives messages from vehicles, pedestrians, road sensors, traffic light controllers, and/or other types of devices and broadcast the messages in their coverage area. However, a DSRC RSU may be limited to 300 meters. Because of the short transmission range, achieving adequate coverage in a geographic area may require a large number of RSU, resulting in a high deployment cost.

Another V2X technology is Cellular V2X (C-V2X). C-V2X may use cellular wireless communication based on a Third Generation Partnership Project (3GPP) standard, such as Fourth Generation (4G) Long Term Evolution (LTE) air interface or a Fifth Generation (5G) New Radio (NR) air interface. In some implementations, C-V2X may use a short-range PC5 interface in the 5.9 GHz band for C-V2V, C-V2P, and/or C-V2I communication. In other implementations, C-V2X may use Vehicle-to-Network (V2N) communication that uses a Uu interface in the licensed spectrum, for example in the 20 Megahertz (MHz) band, to support communication between vehicles and a cellular Radio Access Network (RAN) of base stations.

A V2X object exchange system may be configured to enable devices associated with different V2X technologies to communicate with each other. The V2X object exchange system may provide coverage using Fourth Generation (4G)

Long Term Evolution (LTE) and/or Fifth Generation (5G) New Radio (NR) cellular wireless communication using a Uu interface. For example, the V2X object exchange system may be implemented in a Multi-Access Edge Computing (MEC) device and associated with a set of 4G and/or 5G base stations, enabling devices in the coverage area to send and receive V2X message via the V2X object exchange system.

The V2X object exchange system may register client devices to receive V2X messages. The client devices may include on-board diagnostics (OBD) devices in vehicles and/or mobile communication devices associated with vehicles and/or other types of users that may be in the vicinity of vehicles, such as, for example, pedestrians, bicyclists, and/or riders of electric scooters. Furthermore, RSUs configured to broadcast messages to vehicles using WLAN signals, such as, for example, DSRC RSUs, CAM RSUs, DSSS RSUs, and/or RSUs configured to broadcast cellular wireless signals using a PC5 interface, may register as client devices of the V2X object exchange system. Thus, the V2X object exchange system may enable V2X messages to be exchanged between client devices, such as vehicles, that use different communication technologies, including, for example, cellular wireless communication (e.g., 5G NR, 4G LTE, etc.) or WLAN communication via an RSU.

The V2X object exchange system may handle a large number of client devices, such as vehicles, that may be sending a large number of messages, such as BSMs. Furthermore, the V2X object exchange system may receive and/or generate other messages that may need to be forwarded to client devices. Therefore, the V2X object exchange system may need to determine which messages are relevant to each client device in order to reduce the sending of unnecessary messages that are not relevant, since processing and sending non-relevant messages drains the resources of the V2X object exchange system, such as processor, memory, and/or network bandwidth resources.

Implementations described herein relate to a V2X dynamic geofence. The V2X object exchange system may be configured to generate and maintain a dynamic geofence for each client device, such as a vehicle and/or a mobile communication device, based on a current position of each client device. The dynamic geofence associated with the client device may define a geographical boundary around the current position of the client device and may be used to select relevant V2X messages that are to be sent to the client device. For example, each V2X message may be associated with a location and if the location of a V2X message is within the boundaries of the geofence, the V2X message may be designated as relevant to the client device and forwarded to the client device. If a V2X message is outside the boundaries of the geofence, the V2X message may not be designated as relevant to the client device and may not be forwarded to the client device.

In some implementations, the V2X object exchange system may generate the geofence based on a speed limit of a road associated with a vehicle. In other implementations, the V2X object exchange system may generate the geofence based on an estimated braking distance associated with the client device. The estimated braking distance may be based on a speed and weight (e.g., estimated based on a vehicle type) of a vehicle associated with the client device. In other implementation, the V2X object exchange system may use additional parameters to estimate the braking distance and/or generate the geofence.

Thus, the V2X object exchange system may be configured to select a vehicle, or another type of mobile client device, attached to a base station, determine a speed of the vehicle, determine a vehicle type for the vehicle, calculate an estimated braking distance for the vehicle based on the determined speed and the determined vehicle type, and generate a geofence for the vehicle based on the calculated estimated braking distance. The V2X object exchange system may then use the generated geofence to identify relevant V2X messages (e.g., BSM messages, PSM messages, RSA messages, EVA messages, SpaT messages, etc.) to be forwarded to the vehicle and forward the identified relevant V2X messages to the vehicle via the base station. In some implementations, V2X object exchange system may estimate the braking distance and/or generate the geofence using a machine learning model trained to predict the estimated braking distance based on a plurality of vehicle parameters and a plurality of environmental parameters.

The V2X object exchange system may use additional parameters to generate the geofence. For example, the V2X object exchange system may determine a time of day (e.g., day vs. night, rush hour vs. non-rush hour, etc.); a weather condition (e.g., temperature, precipitation, wind, sun direction, etc.) associated with the vehicle's location; a road parameter (e.g., a speed limit, road incline, road curvature, road visibility, etc.) associated with the vehicle's location; a vehicle density associated with the vehicle's location; a pedestrian density associated with the vehicle's location; a driver type (e.g., a human driver, an autonomous vehicle, a student driver, a distracted driver, etc.) associated with the vehicle; and/or other types of parameters that may be used to determine a geofence. The V2X object exchange system may use one or more of the additional parameters to generate or refine the geofence.

The V2X object exchange system may further refine the generated geofence based on a map of an area associated with the vehicle's location. For example, the V2X object exchange system may adjust a shape of the generated geofence based on at least one of an intersection, a divided highway, a pedestrian or bicycle trail, a parking lot, a building, and/or another feature identified in the map of the area.

Furthermore, the V2X object exchange system may generate and maintain an alerting geofence. An alerting geofence may be associated with an alert message that is sent to any client device that enters the alert geofence whose geofence intersects with the alerting geofence. Thus, if the V2X object exchange system determines that a generated geofence associated with a client device intersects an alerting geofence, the V2X object exchange system may forward an alert message associated with the alerting geofence to the client device. The alerting geofence may be associated with an emergency vehicle, a roadwork site, a school zone, a hospital, and/or another type of entity or situation that may generate an alert message for vehicles.

Furthermore, a V2X object exchange system may need to be able to generate and/or update a geofence, as well as receive, process, and send V2X messages within short periods of time (e.g., 10 times a second, etc.), in order to provide safety information to client devices during situations involving vehicles moving at high speeds. The required low latency, high processing capacity, and high processing speed may be achieved with a wireless 5G NR connection to a base station and a MEC network associated with the base station. For example, the V2X object exchange system in a MEC network communicating with client devices using 5G NR wireless signals may receive a V2X message, determine which client devices should receive the V2X message based on geofences associated with client devices, and send the V2X message to the determined client devices within 50-100 milliseconds (ms). In comparison, other wireless network technologies may experience latencies of 200 ms or more, which may not be adequate to warn a vehicle in time to avoid a collision.

FIG. 1 is a diagram of an exemplary environment 100 in which the systems and/or methods, described herein, may be implemented. As shown in FIG. 1, environment 100 may include one or more vehicles 110 that include on-board diagnostics (OBD) devices 112, pedestrians 114, bicyclists 116, scooters 118, mobile communication devices 120, cameras 122, traffic lights 124, a radio access network (RAN) 130 that includes base station(s) 135, a MEC network 140 that includes MEC devices 145, a core network 150, packet data networks 160-A to 160-Y, a map system 170, an alert system 175, a traffic light controller 180, and one or more RSU systems 190 that include RSU(s) 195. Vehicles 110, OBD devices 112, pedestrians 114, bicyclists 116, scooters 118, mobile communication devices 120, cameras 122, traffic lights 124, base stations 135, packet data networks 160, and RSUs 195 may be referred to herein collectively as "vehicles 110," "pedestrians 114," "bicyclists 116," "scooters 118," "mobile communication devices 120," "cameras 122," "traffic lights 124," "base stations 135," "MEC devices 145," "packet data networks 160," and "RSUs 195," and individually as "vehicle 110," "OBD device 112," "pedestrian 114," "bicyclist 116," "scooter 118," "mobile communication device 120," "camera 122," "traffic light 124," "base station 135," "MEC device 145," "packet data network 160," and "RSU 195," respectively.

Vehicles 110 may include motorized vehicles in an area serviced by RAN 130 and/or area serviced by RSU 195. Each vehicle may include an OBD device 112 installed in the vehicle. OBD device 112 may be plugged into the OBD port of vehicle 110 and may collect information relating to the status and operation of vehicle 110. For example, vehicle 110-A may include OBD device 112-A that communicates with base station 135 and vehicle 110-B may include OBD device 112-B that communicates with RSU 195. Furthermore, OBD device 112 may include a collection of sensors and receivers, such as a Global Positioning System (GPS) receiver, a Real-Time Kinematic (RTK) receiver, a compass, and/or an accelerometer, which generate information relating to the movement of vehicle 110.

Pedestrians 114 may include pedestrians in the area associated with vehicles 110. Bicyclists 116 may include moving bicyclists in the area associated with vehicles 110. Scooters 118 may include moving electric scooters in the area associated with vehicles 110. Mobile communication devices 120 may be associated with particular vehicles 110, pedestrians 114, bicyclists 116, scooters 118, and/or other types of street entities. For example, a driver of vehicle 110, pedestrian 114, bicyclist 116, and/or a user of scooter 118 may each have in possession a mobile communication device 120.

Mobile communication device 120 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer device with wireless communication capabilities and/or a user interface. Mobile communication device 120 may communicate with base station 135 using cellular wireless signals.

Cameras 122 may be installed throughout the area associated with vehicles. Cameras 122 may be installed on poles, buildings, and/or other structures in positions that enable capturing images of vehicles 110, pedestrians 114, bicyclists 116, scooters 118, and/or other types of street entities in the area. In other implementations, cameras 122 may include mobile cameras, such as, for example, cameras included in mobile communication devices or vehicles. Camera 122 may include a digital camera for capturing and digitizing images using an array of sensors. The captured image data may include a continuous image sequence (e.g., video), a limited image sequence, still images, and/or a combination thereof. Cameras 122 may capture image and/or video data using visible light, infrared light, and/or other non-visible electromagnetic radiation (e.g., ultraviolet light, infrared light, terahertz radiation, etc.). In some implementations, camera 122 may include a depth camera that captures depth information. For example, for each pixel, the depth camera may obtain color information as well as depth information.

Camera 122 may include wireless communication functionality to transmit captured images or video of vehicles 110, pedestrians 114, bicyclists 116, and/or scooters 118 to MEC network 140 via base station 135 and/or to RSU 195. For example, camera 122-A may communicate with base station 135 and camera 122-B may communicate with RSU 195. Camera 122 may perform object recognition to identify particular vehicles 110, pedestrians 114, bicyclists 116, scooters 118 and/or other types of street entities in the captured images or videos and/or determine the position, bearing, speed, and/or acceleration of particular vehicles 110, pedestrians 114, bicyclists 116, scooters 118, and/or other types of street entities in the captured images or videos. Camera 122 may provide the object detection information to a V2X object exchange system (e.g., located in MEC device 145) via base station 135 and the V2X object exchange system may generate a V2X message based on the received information, such as, for example, a BSM, a PSM, etc.

Traffic lights 124 may be located in the area associated with vehicles 110, pedestrians 114, bicyclists 116, and/or scooters 118 and may include signaling devices to control the flow of traffic at road intersections, bicycle trails, and/or pedestrian crossings. Traffic lights 124 may be controlled by one or more traffic light controllers 180. In some implementations, traffic light 124 may send SPaT messages via wireless signals. For example, traffic light 124-A may communicate with base station 135 and traffic light 124-B may communicate with RSU 195.

RAN 130 may include base stations 135. In some implementations, base station 135 may include a 5G NR base station, also referred to as a gNodeB. In other implementations, base station 135 may include a 4G LTE base station, also referred to as an eNodeB. Each base station 135 may include devices and/or components to enable wireless communication with OBD devices 112, mobile communication devices 120, cameras 122, RSUs 195, and/or other devices perceived as UE devices by base station 135.

RAN 130 may include features associated with an LTE Advanced (LTE-A) network and/or a 5G core network or other advanced network, such as management of 5G NR base stations; carrier aggregation; ultra-wideband (UWB) functionality, advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; Machine-Type Communication (MTC) functionality, such as 1.4 Megahertz (MHz)

wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. Base station 135 may be associated with MEC network 140.

MEC network 140 may provide MEC services for UE devices attached to base station 135. MEC network 140 may be in proximity to the one or more base stations 135 from a geographical and network topology perspective. As an example, MEC network 140 may be located on a same site as base station 135. As another example, MEC network 140 may be geographically closer to base station 135, and reachable via fewer network hops and/or fewer switches, than other base station and/or packet data networks 160. As yet another example, MEC network 140 may be reached without having to interface with a gateway device, such as a 4G Packet Data Network Gateway (PGW) or a 5G User Plane Function (UPF).

MEC network 140 may interface with RAN 130 and/or with core network 150 via a MEC gateway device (not shown in FIG. 1). In some implementations, MEC network 140 may be connected to RAN 130 via a direct connection to base station 135. For example, MEC network 140 may connect to a gNodeB via an N3 interface. In other implementations, MEC network 140 may include, or be included in, core network 150. As an example, MEC network 140 may connect to a Session Management Function (SMF) via an N4 interface. MEC network 140 may support UE device mobility and handover application sessions between MEC network 140 and another MEC network.

MEC network 140 may include a MEC device 145. MEC network 140 may support device registration, discovery, and/or management of MEC devices 145 in MEC network 140. MEC device 145 may include particular hardware components, such as central processing units (CPUs), graphics processing units (GPUs), tensor or dataflow processing units, hardware accelerators, and/or other types of hardware components. Furthermore, MEC device 145 may include particular software components, such as a particular operating system, virtual machine, virtual container, application, and/or another type of software components or programs. MEC device 145 may connect to base station 135 in RAN 130 and provide one or more MEC services to UE devices connected to base station 135. Consistent with implementations described herein, MEC device 145 may include a V2X object exchange system that uses dynamic geofences to identify relevant messages to be forwarded to client devices (e.g., vehicles 110, mobile communication devices 120, etc.) and that enables V2X communication with OBD devices 112, mobile communication devices 120, cameras 122, traffic lights 124, and RSUs 195.

Core network 150 may manage communication sessions for UE devices serviced by base station 135. For example, core network 150 may establish an Internet Protocol (IP) connection between UE devices and a packet data network 160. Furthermore, core network 150 may enable UE devices to communicate with an application server, and/or another type of device, located in a packet data network 160 using a communication method that does not require the establishment of an Internet Protocol (IP) connection between a UE device and packet data network 160, such as, for example, Data over Non-Access Stratum (DoNAS). For example, in other implementations, a V2X object exchange system may be included in a server device in core network 150, rather than in MEC device 145 in MEC network 140.

In some implementations, core network 150 may include an LTE core network (e.g., an evolved packet core (EPC) network). An EPC network may include devices that implement: network functions that include a Mobility Management Entity (MME) for control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 160; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In other implementations, core network 150 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 160, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

Packet data networks 160-A to 160-N may each include a packet data network. A particular packet data network 160 may be associated with an Access Point Name (APN) and a UE device may request a connection to the particular packet data network 160 using the APN. Packet data network 160 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, an intranet, or a combination of networks.

Map system 170 may include one or more computer devices, such as server devices, configured to generate and/or maintain maps of the area associated with base stations 135 and/or RSUs 195. A map of the area may include the location of streets and street lanes, buildings and other structures, traffic lights, pedestrian walkways and pedestrian crossings, bicycle trails and bicycle trail crossings, and/or other information that may be used by a V2X object exchange system to generate and/or refine a geofence. Map system 170 may provide maps of the area to V2X object exchange system in MEC device 145.

Alert system 175 may include one or more computer devices, such as server devices, configured to generate V2X messages based on information obtained from other devices. As an example, alert system 175 may receive information from road sensors that sense the presence of vehicles 110, such as road sensors that detect traffic congestion, vehicle accidents, hazardous road conditions, road construction, road closures, and/or other types of road conditions. As another example, alert system 175 may receive and/or aggregate weather information from a weather reporting system. As yet another example, alert system 175 may receive and/or aggregate traffic information from a traffic reporting system. As yet another example, alert system 175 may receive alert information from a law enforcement agency. Alert system 175 may provide the received and/or aggregated information to a V2X object exchange system in MEC device 145 and the V2X object exchange system may use the received and/or aggregated information to generate and/or refine a geofence.

Traffic light controller 180 may include one or more computer devices, such as server devices, configured to control traffic lights 124. Traffic light controller 180 may provide information relating to the status of particular traffic lights 124, such as SPaT messages, to a V2X object exchange system in MEC device 145 and V2X object exchange system may use the received SPaT messages to generate and/or refine a geofence.

RSU system 190 may include RSU 195, OBD devices 112 in vehicles 110, cameras 122, and traffic lights 124. RSU 195 may include, for example, a DSRC RSU that communicates with vehicles 110, cameras 122, and traffic lights 124 using DSRC messages. As another example, RSU 195 may include a PC5 RSU that communicates with vehicles 110, cameras 122, and traffic lights 124 using PC5 messages. As yet another example, RSU 195 may include a CAM RSU that communicates with vehicles 110, cameras 122, and traffic lights 124 using CAM messages based on an ETSI EN 302 637 standard. As yet another example, RSU 195 may include a DSSS RSU that communicates with vehicles 110, cameras 122, and traffic lights 124 using DSSS messages.

RSU 195 may receive V2X messages from OBD devices 112, cameras 122, and/or traffic lights 124 and may broadcast received V2X message to all client devices of RSU 195 within the coverage area of RSU 190. Furthermore, RSU 195 may forward V2X messages, received from OBD devices 112, cameras 122, and/or traffic lights 124, as V2X messages to a V2X object exchange system in MEC device 145 via base station 135 using a Uu interface. Moreover, RSU 195 may receive a V2X message from V2X object exchange system in MEC device 145 via base station 135 using a Uu interface and broadcast the received V2X message as a V2X message to client devices in its coverage area.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
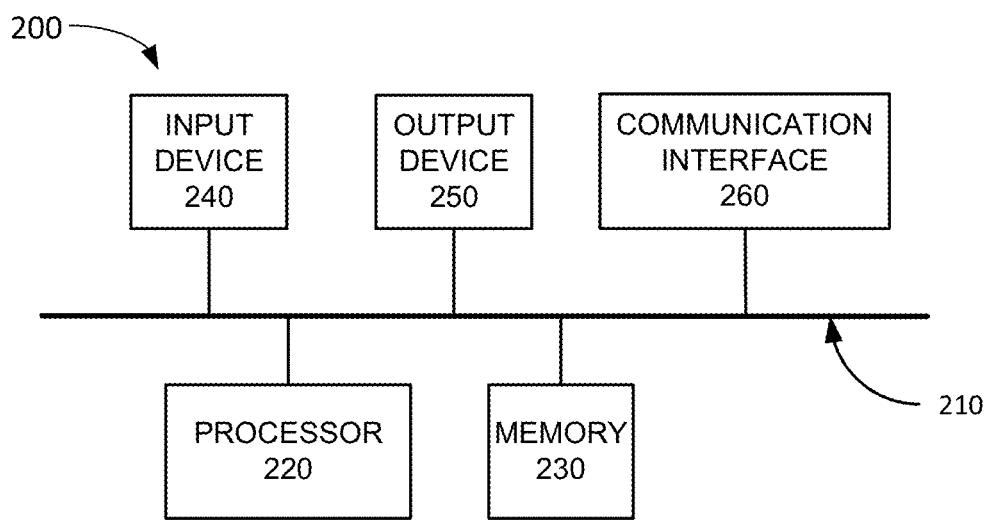
FIG. 2 illustrates exemplary components of a device that may be included in the environment of FIG. 1 according to an implementation described herein.

FIG. 2 is a diagram illustrating example components of a device 200 according to an implementation described herein. OBD device 112, mobile communication device 120, camera 122, base station 135, MEC device 145, map system 170, alert system 175, traffic light controller 180, and/or RSU 195 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to the generation and use of a dynamic geofence in a V2X object exchange system. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
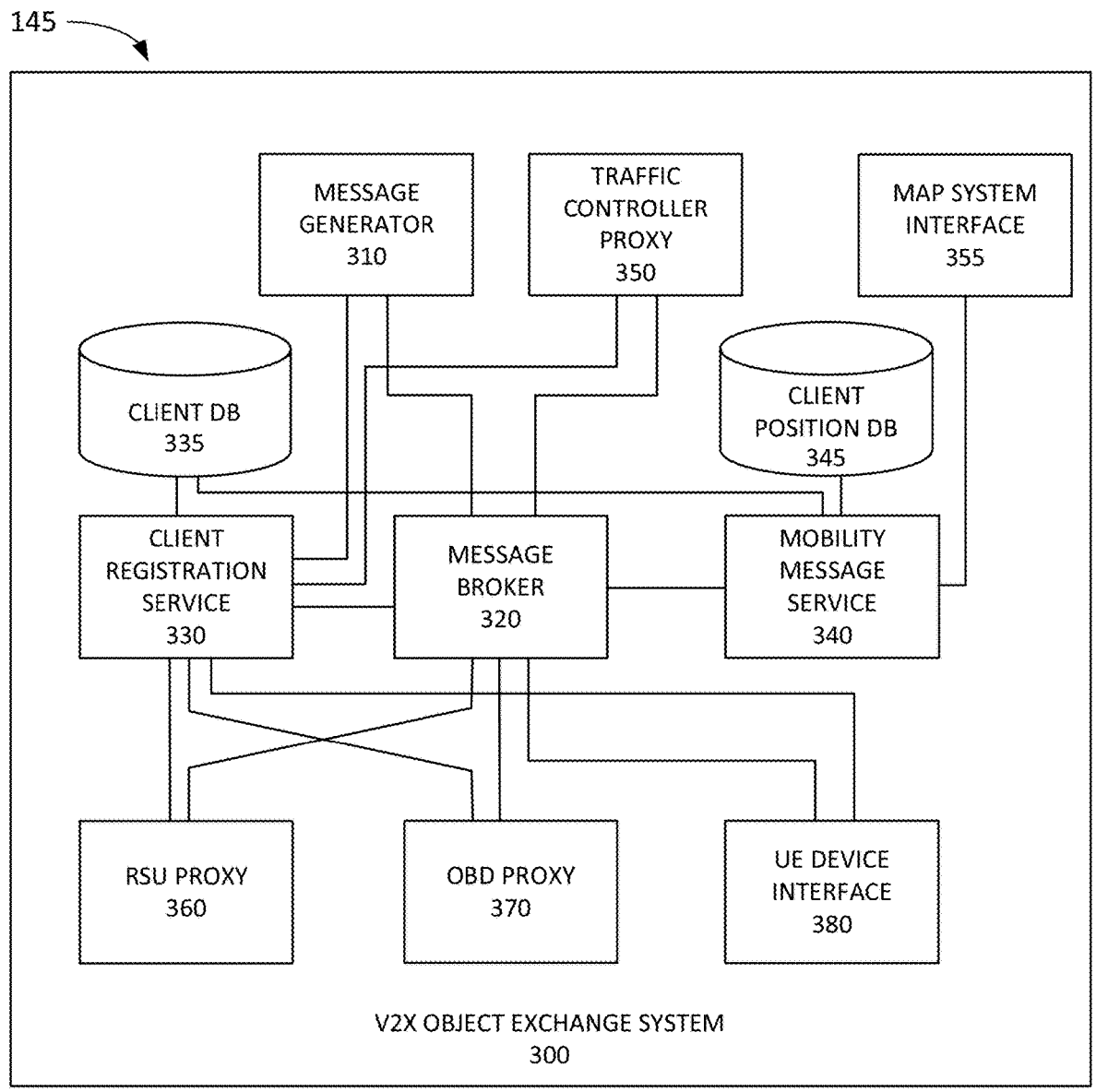
FIG. 3 illustrates exemplary components of the Multi-access Edge Computing (MEC) device of FIG. 1 according to an implementation described herein.

FIG. 3 is a diagram illustrating exemplary components of MEC device 145. The components of MEC device 145 may be implemented, for example, via processor 220 executing instructions from memory 230. Alternatively, some or all of the components of MEC device 145 may be implemented via hard-wired circuitry. Furthermore, some or all of the components of MEC device 145 may be implemented using one or more hardware accelerators, such as GPUs, tensor or dataflow processing units, and/or other types of hardware accelerators.

As shown in FIG. 3, MEC device 145 may include a V2X object exchange system 300. V2X object exchange system 300 may enable OBD devices 112, mobile communication devices 120, cameras 122, traffic lights 124, and/or RSUs 195 to exchange V2X messages using a Uu interface. Although V2X object exchange system 300 is shown as being included in MEC device 145, in other implementations, some or all of the components of V2X object exchange system 300 may be implemented in a device outside of MEC network 140 (e.g., in core network 150) and may be coupled to low latency device (e.g., hardware accelerators) of MEC device 145 as needed to perform low latency processing. As shown in FIG. 3, V2X object exchange system 300 may include a message generator 310, a message broker 320, a client registration service 330, a client DB 335, a mobility message service 340, a client position DB 345, a traffic controller proxy 350, a map system interface 355, an RSU proxy 360, an OBD proxy 370, and a UE device interface 380.

Message generator 310 may generate V2X messages based on information received from cameras 122 and/or alert system 175. For example, message generator 310 may receive object recognition information from camera 122 and generate a BSM or a PSM based on the received object recognition information. As an example, camera 122 may detect the presence of pedestrian 114, bicyclist 116, electric scooter 118, and/or another type of street entity at a particular location and moving in a particular direction and message generator 310 may generate a PSM with information indicating the location and direction of movement of a pedestrian, bicyclist, or electric scooter. As another example, camera 122 may detect the presence of vehicle 110 at a particular location and moving in a particular direction and message generator 310 may generate a BSM with information indicating the location and direction of movement of vehicle 110.

As another example, message generator 310 may receive an alert message from alert system 175, such as an alert message relating to traffic congestion, vehicle accidents, hazardous road conditions, road construction, road closures, weather events, law enforcement emergencies, and/or other types of alert information. In response, message generator 310 may generate an RSA message with the alert information.

Message broker 320 may receive messages from client devices, such as OBD devices 112, mobile communication devices 120, and/or RSUs 195, as well as from cameras 122, traffic lights 124 and/or traffic light controller 180, and/or V2X messages generated by message generator 310. Message broker 320 may publish the received V2X messages to mobility message service 340. Furthermore, message broker 320 may receive a client-specific V2X message from mobility message service 340 and may publish the received client-specific V2X message to a component that is enabled to deliver the client-specific V2X message to client device, such as RSU proxy 360, OBD proxy 370, and/or UE device interface 380. In some implementations, message broker 320 may publish V2X messages using Message Queueing Telemetry Transport (MQTT). In other implementations, message broker 320 may use a different publish-subscribe protocol to distribute V2X messages.

Client registration service 330 may register client devices. Client registration service 330 may assign a client identifier (ID) to each client device, obtain information relating to the client device, such as a location associated with the client device and/or subscription information indicating the message types that the client device is to receive, and store the obtained information in client DB 335. Client DB 335 may store information relating to particular clients registered with V2X object exchange system 300. For example, for each client, client DB 335 may store a unique client ID assigned to the client device by V2X object exchange system 300; an address associated with the particular client device that may be used to send messages to the particular client device, such as, for example, an IP address, an International Mobile Subscriber Identity (IMSI), an International Mobile Station Equipment Identity (IMEI), etc.; information identifying a client type associated with the client device (e.g., an RSU 195 of a particular type, an OBD device 112 of a particular type, a mobile communication device 120 of a particular type, etc.); information identify message types to which the particular client device is subscribed, such as, for example, as a BSM message type, a PSM message type, an EVA message type, a SPaT message type, an RSA message type, a particular type of BSM message, a particular type of PSM message, etc.; and/or other types of information associated with a client device.

Mobility message service 340 may publish V2X messages to particular client devices. For example, mobility message service 340 may receive a V2X message over MQTT and determine which client devices are to receive the V2X message. Mobility message service 340 may maintain information relating to the location of each client device in client position DB 345. Exemplary information that is stored in client position DB 345 is described below with reference to FIG. 5. Mobility message service 340 may generate dynamic geofences for client devices that are updated at particular intervals and centered on the location of each client device. Exemplary components of mobility message service 340 are described below with reference to FIG. 4.

Mobility message service 340 may determine a location and message type for a V2X message and may identify client devices, associated with a geofence that encompasses the location associated with the V2X message, which are subscribed to receive V2X messages of the determined message type, based on information stored in client DB 335 and/or client position DB 345. The identified client devices may include OBD devices 112, mobile communication devices 120, and/or RSUs 195. RSUs 195 may be associated with a static geofence since RSUs 195 are not mobile.

Traffic controller proxy 350 may communicate with traffic lights 124 and/or traffic light controller 180. For example, traffic controller proxy 350 may receive SPaT messages from traffic lights 124 and/or traffic light controller 180 and provide the SPaT messages to message broker 320. RSU proxy 360 may be configured to interface RSUs 195 with V2X object exchange system 300. RSU proxy 360 may register each RSU 195 as a client with client registration service 330 and may receive a client ID for each RSU 195 from client registration service 330. Furthermore, RSU proxy 360 may identify a location for RSU 195 and determine a radius of interest for RSU 195. The location information and radius of interest may be used to determine the geographic area associated with RSU 195. After registering RSU 195, RSU proxy 360 may then open a User Datagram Protocol (UDP) listener to listen for messages from RSU 195. When RSU proxy 360 receives a message from RSU 195, RSU proxy 360 may publish the received message to message broker 320. An example format used by RSU proxy 360 to publish the received incoming message may include: V2X/1/IN/RSU/NA/[vendorID]/[RSU ID]/UPER/[message type].

OBD proxy 370 may support OBD devices 112 configured for PC5 but without the capability to use a Uu interface. OBD proxy 370 may register each PC5 OBD device 112 as a client with client registration service 330 and may receive a client ID for each PC5 OBD device 112 from client registration service 330. After registering the PC5 OBD device 112, OBD proxy 370 may then open a UDP listener to listen for messages from the PC5 OBD device 112. When OBD proxy 370 receives a message from the PC5 OBD device 112, OBD proxy 370 may publish the received message to message broker 320. An example format used by OBD proxy 370 to publish the received incoming message may include: V2X/1/IN/OBD/NA/[vendorID]/[OBD ID]/UPER/[message type]. OBD proxy 370 may further subscribe to message broker 320 to receive OBD-specific topics. An example format used by OBD proxy 370 to subscribe to OBD messages may include: V2X/1/OUT/OBD/NA/[vendorID]/[OBD ID]/UPER/[message type].

UE device interface 380 may be configured to communicate with mobile communication devices 120 and/or OBD devices 112 configured to use a Uu interface. UE device interface 380 may register each OBD device 112 and/or mobile communication device 120 as a client with client registration service 330 and may receive a client ID for each OBD device 112 and/or mobile communication device 120 from client registration service 330. After registering OBD device 112 and/or mobile communication device 120, UE device interface 380 may then open a UDP listener to listen for messages from OBD device 112 and/or mobile communication device 120. When UE device interface 380 receives a message from OBD device 112 and/or mobile communication device 120, UE device interface 380 may publish the received message to message broker 320. Furthermore, UE device interface 380 may further subscribe to message broker 320 to receive particular topics relating to OBD device 112 and/or mobile communication device 120.

Although FIG. 3 shows exemplary components of MEC device 145, in other implementations, MEC device 145 may include fewer components, different components, differently arranged components, or additional components than depicted in FIG. 3. Additionally, or alternatively, one or more components of MEC device 145 may perform functions described as being performed by one or more other components of MEC device 145.

Figure 4A:
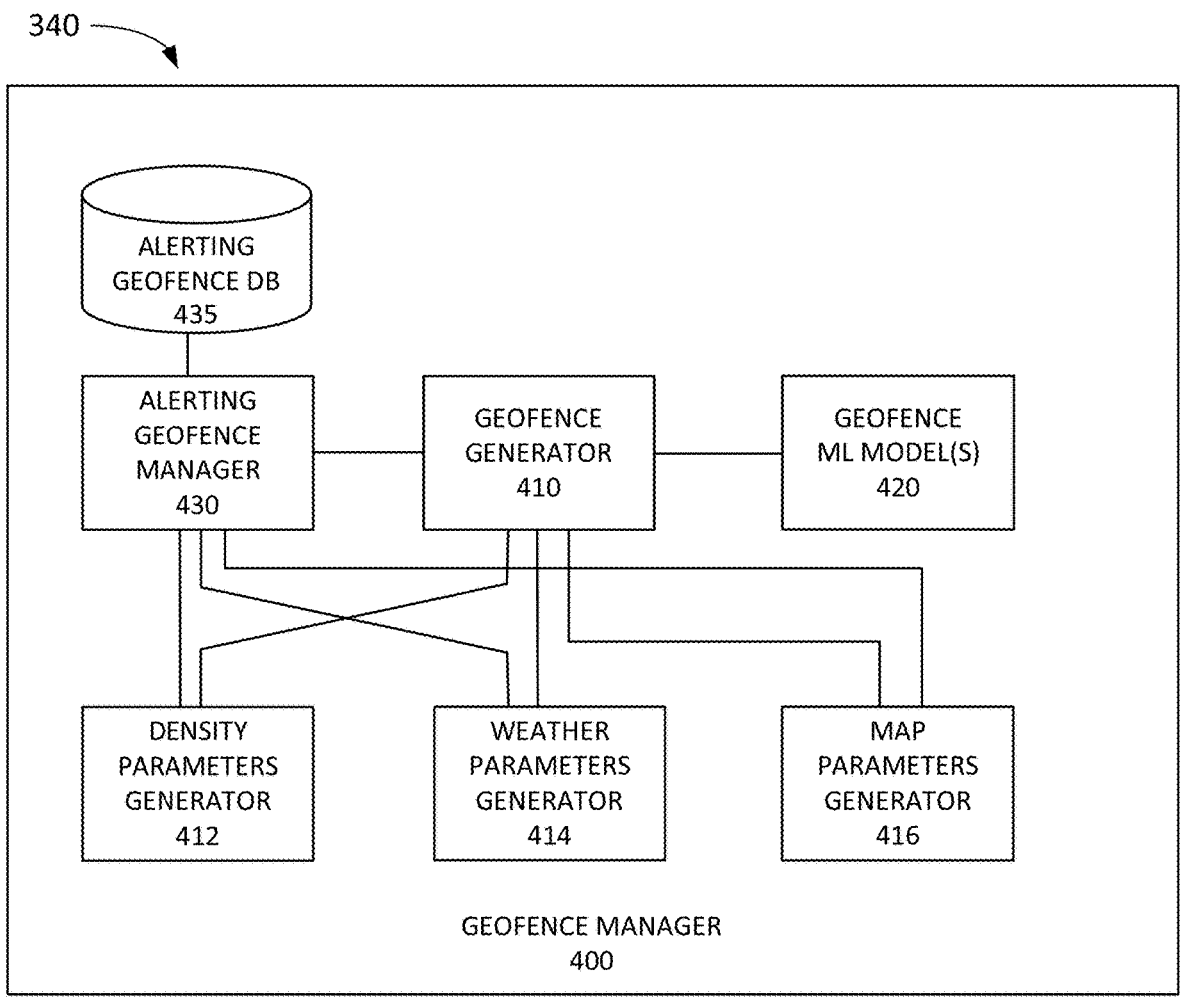
FIG. 4A illustrates exemplary components of the mobility message service of FIG. 3 according to an implementation described herein.

FIG. 4A illustrates exemplary components of the mobility message service 340. As shown in FIG. 4A, mobility message service 340 may include a geofence generator 410, a density parameters generator 412, a weather parameters generator 414, a map parameters generator 416, geofence ML model(s) 420, an alerting geofence manager 430, and an alerting geofence DB 435.

Geofence generator 410 may generate and/or maintain dynamic geofences for client devices, such as vehicles 110, mobile communication devices 120, and/or other types of mobile client devices. Geofence generator 410 may determine a current location of a client device and generate a geofence boundary around the current location of the client device. Geofence generator 4410 may determine a speed and a vehicle type for the client device, estimate a braking distance for the client device based on speed and vehicle type, and generate a geofence with a size based on the estimated braking distance. For example, the generated geofence may have a circular shape centered on the current location of the client device with a radius based on the estimated braking distance for the vehicle associated with the client device. In some implementations, geofence generator 410 may use one or more geofence ML model(s) 420 to estimate the braking distance and/or generate the geofence. An exemplary geofence ML model 420 is described below with reference to FIG. 4B.

Furthermore, geofence generator 410 may use one or more additional parameters to generate the geofence. In some implementations, geofence generator 410 may use a set of parameters, including the speed and vehicle type, to generate the geofence. In other implementations, geofence generator 410 may generate a first-order approximation geofence based on the speed and vehicle type associated with the vehicle, and use the first-order approximation geofence while a more detailed geofence is being generated. The more detailed geofence may be generated using the speed and vehicle type along with the one or more additional parameters. Geofence generator 410 may update the center and radius of the geofence at particular intervals (e.g., once per second, once per 10 seconds, etc.). Moreover, in some implementations, geofence generator 410 may use a speed limit for a road, associated with vehicle's location and obtained from map system 170, to compute the first-order approximation geofence, and may compute the speed of the vehicle and use the speed of the vehicle to calculate the more detailed geofence. Geofence generator 410 may also use the speed limit of the road as an estimate for the speed of the vehicle in situations in which the speed of the vehicle cannot accurately be determined.

Geofence generator 410 may use time of day as an additional parameter to generate the geofence. For example, geofence generator 410 may increase the radius of the geofence at night due to reduced visibility and longer reaction times of drivers. As another example, geofence generator 410 may increase the radius of the geofence during rush hour due to the higher density of vehicles on the road.

Geofence generator 410 may use a driver type as an additional parameter to generate the geofence. For example, a vehicle may be tagged with a particular driver type, such as a human driver type, an autonomous vehicle driver type, a student driver type. The driver type may be obtained, for example, during registration of a vehicle with V2X object exchange system 300. Geofence generator 410 may generate a smaller geofence for an autonomous vehicle and a larger geofence for a human driver. Furthermore, geofence generator 410 may generate a larger geofence for a student driver. Furthermore, a vehicle may be tagged as being associated with a distracted driver. For example, V2X object exchange system 300 may tag a vehicle as being associated with a distracted driver based on a driving pattern, a driving speed in relation to other vehicles in the same area, and/or based on other types of information. Geofence generator 410 may generate a larger geofence for a distracted driver.

Geofence generator 410 may use a vehicle density and/or a pedestrian density as an additional parameter to generate the geofence. Geofence generator 410 may obtain a vehicle density parameter and/or a pedestrian density parameter from density parameters generator 412. Density parameters generator 412 may generate a vehicle density parameter based on a determined vehicle density. The vehicle density may be determined, for example, based on the number of vehicles in a geographical area based on information relating to vehicle positions stored in client position DB 345. Density parameters generator 412 may further generate a pedestrian density parameter based on a determined pedestrian density. The pedestrian density may be determined, for example, based on pedestrians detected by cameras 122 and/or mobile communication devices 120 associated with pedestrians and registered as client devices with V2X object exchange system 300. Geofence generator 410 may increase the radius of the geofence when the vehicle density and/or the pedestrian density increases.

Geofence generator 410 may use a weather condition as an additional parameter to generate the geofence. Geofence generator 410 may obtain a weather parameter from weather parameters generator 414. Weather parameters generator 414 may generate a weather parameter based on a weather condition associated with the location of the vehicle. The weather condition may be determined based on an alert received from alert system 175, for example. Geofence generator 410 may increase the radius of the geofence based on an inclement weather condition (e.g., rain, snow, icy road, high wind, etc.), based on the sun direction (e.g., if the sun direction is likely to impact a driver's vision), and/or based on other types of weather conditions.

Geofence generator 410 may use a road parameter as an additional parameter to generate the geofence. Geofence generator 410 may obtain a road parameter from road parameters generator 416. Weather parameters generator 414 may generate a weather parameter based on a weather condition associated with the location of the vehicle. The weather condition may be determined based on map information received from map system 170, for example. Geofence generator 410 may increase the radius of the geofence based on a road condition that may increase the braking distance, reaction time of the driver of a vehicle, and/or the likelihood of an accident. For example, geofence generator 410 may increase the radius of the geofence based on a steep road incline (e.g., a road incline greater than a threshold), a high road curvature (e.g., a road curvature greater than a threshold), a low visibility (e.g., based on a visibility value calculated for a particular road section), etc. As another example, geofence generator 410 may adjust the radius of the geofence based on a speed limit associated with the location of the vehicle by increasing the radius of the geofence based on a high-speed limit or decreasing the radius of the geofence based on a low-speed limit.

Furthermore, geofence generator 410 may refine a geofence based on map information. For example, geofence generator 410 may adjust a shape of the generated geofence based on an intersection, such as by extending the geofence down the sides of an intersecting street in order to encompass vehicles entering an intersection from an intersecting road. As another example, geofence generator 410 may adjust a shape of the generated geofence based on a divided highway by excluding opposing lanes of traffic from the geofence, as the median of a divided highway may make collisions less likely between vehicles driving in opposite directions. As yet another example, geofence generator 410 may adjust a shape of the generated geofence based on a pedestrian or bicycle trail that either intersects, or is alongside, a road on which the vehicle is driving, by encompassing an area of the pedestrian or bicycle trail to enable the vehicle to alerted to the presence of any detected pedestrians 114, bicycles 116, and/or scooters 118. As yet another example, geofence generator 410 may adjust a shape of the generated geofence based on a parking lot, a building, and/or another type of structure. For example, if a structure separates two adjacent streets, geofence generator 410 may reduce the geofence to exclude an adjacent street from the street on which the vehicle associated with the geofence is driving if the street is separated from the adjacent street by the structure.

Alerting geofence manager 430 may generate and manage alerting geofences and store information relating to alerting geofences in alerting geofence DB 435. When the geofence of a vehicle intersects an alerting geofence, alerting geofence manager 430 may send an RSA message to the vehicle with information relating to the alerting geofence. An alerting geofence may be generated to a static entity, such as a roadwork site, a school zone, or a hospital. An alerting geofence may be generated for a mobile entity, such as an emergency vehicle, a construction vehicle, a school bus, a platoon of autonomous vehicles, and/or another type of vehicle. Thus, for example, an emergency vehicle may be associated with two geofences: a first geofence that determines which messages should be forwarded to the emergency vehicle, and a second geofence that is an alerting geofence to alert other vehicles to the presence of the emergency vehicle.

An alerting geofence may include information identifying the type of alert, such as an Integrated Taxonomic Information System (IT IS) code to be include in an RSA message to be sent to vehicles. Furthermore, the alerting geofence may include a time period during which the alerting geofence is active (e.g., during working hours for a roadwork site). Furthermore, an alerting geofence may be dynamic with respect to the status of a mobile entity, such as an emergency vehicle. For example, the alerting geofence may be extended more toward the front of the emergency vehicle when the emergency vehicle is moving and may be extended more toward the back of the emergency vehicle when the emergency vehicle has stopped.

Although FIG. 4A shows exemplary components of mobility message service 340, in other implementations, mobility message service 340 may include fewer components, different components, differently arranged components, or additional components than depicted in FIG. 4A. Additionally, or alternatively, one or more components of mobility message service 340 may perform functions described as being performed by one or more other components of mobility message service 340.

Figure 4B:
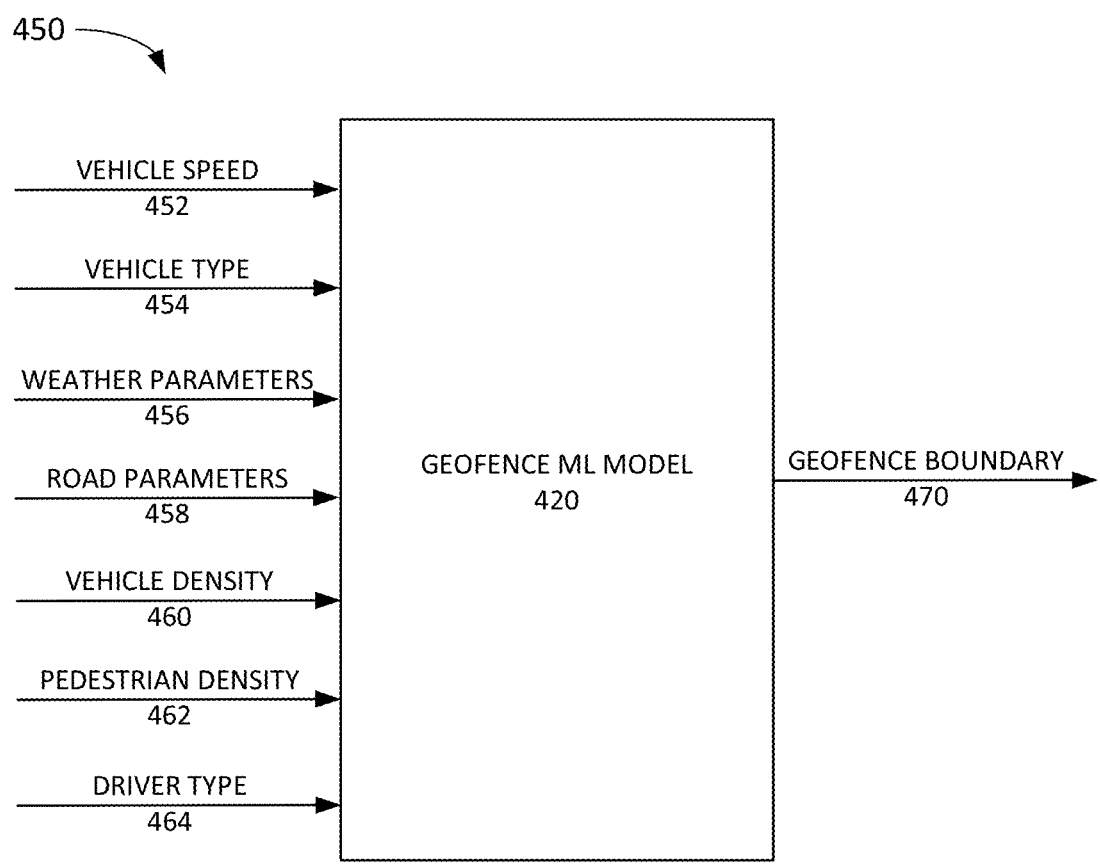
FIG. 4B illustrates an exemplary implementation of the geofence machine learning model of FIG. 4A according to an implementation described herein.

FIG. 4B illustrates an exemplary implementation 450 of geofence ML model 420. As shown in FIG. 4B, in implementation 450, geofence ML model 420 may include a vehicle speed input 452, a vehicle type input 454, a weather parameters input 456, a road parameters input 458, a vehicle density input 460, a pedestrian density input 462, a driver type input 464, and a geofence boundary output 470.

Vehicle speed input 452 may include an input vector that includes one or more values representing a vehicle speed for a vehicle. Vehicle type input 454 may include an input vector that includes one or more values representing a vehicle type associated with the vehicle (e.g., a sedan, a sports utility vehicle, a van, a truck, a semi-trailer truck, etc.). Weather parameters input 456 may include an input vector that includes one or more values representing a weather condition (e.g., whether there is rain, snow, ice, high wind, glaring sun, etc.). Road parameters input 458 may include an input vector that includes one or more values representing a road condition (e.g., a speed limit, a road include, a road curvature, a road visibility, etc.). Vehicle density input 460 may include an input vector that includes one or more values representing a vehicle density (e.g., low vehicle density, medium vehicle density, high vehicle density, very high vehicle density, etc.). Pedestrian density input 462 may include an input vector that includes one or more values representing a pedestrian density (e.g., low pedestrian density, medium pedestrian density, high pedestrian density, very high pedestrian density, etc.). Driver type input 464 may include an input vector that includes one or more values representing a driver type (e.g., human driver, autonomous vehicle, student driver, distracted driver, etc.). Geofence boundary output 470 may include an output vector that defines a size (e.g., a radius) and/or shape for a geofence associated with the vehicle.

Geofence ML model 420 may include a trained deep learning neural network, or another type of machine learning classifier, such as, for example, a Support Vector Machine (SVM) classifier, a K-nearest neighbors (KNN) classifier, a naïve Bayesian classifier, a random forest classifier, a logistic regression classifier, a linear discriminant analysis classifier, a quadratic linear discriminant analysis classifier, a maximum entropy classifier, a kernel density estimation classifier, a principal component analysis (PCA) classifier, etc.

Although FIG. 4B shows exemplary inputs and outputs of geofence ML model 420, in other implementations, geofence ML model 420 may include fewer inputs, different inputs and/or outputs, differently arranged inputs and/or outputs, or additional inputs and/or outputs than depicted in FIG. 4B. Furthermore, while FIG. 4B shows a single geofence ML model 420, in other implementations, geofence manager 400 may use multiple geofence ML models 420. For example, geofence manager 400 may use a first geofence ML model 420 to generate a first-order approximation geofence based on vehicle speed input 452 and vehicle type input 454, and a second geofence ML model 420 to generate a refined geofence based on additional factors, such as, for example, using vehicle speed input 452, vehicle type input 454, weather parameters input 456, road parameters input 458, vehicle density input 460, pedestrian density input 462, driver type input 464, and/or geofence boundary output 470.

Figure 5:
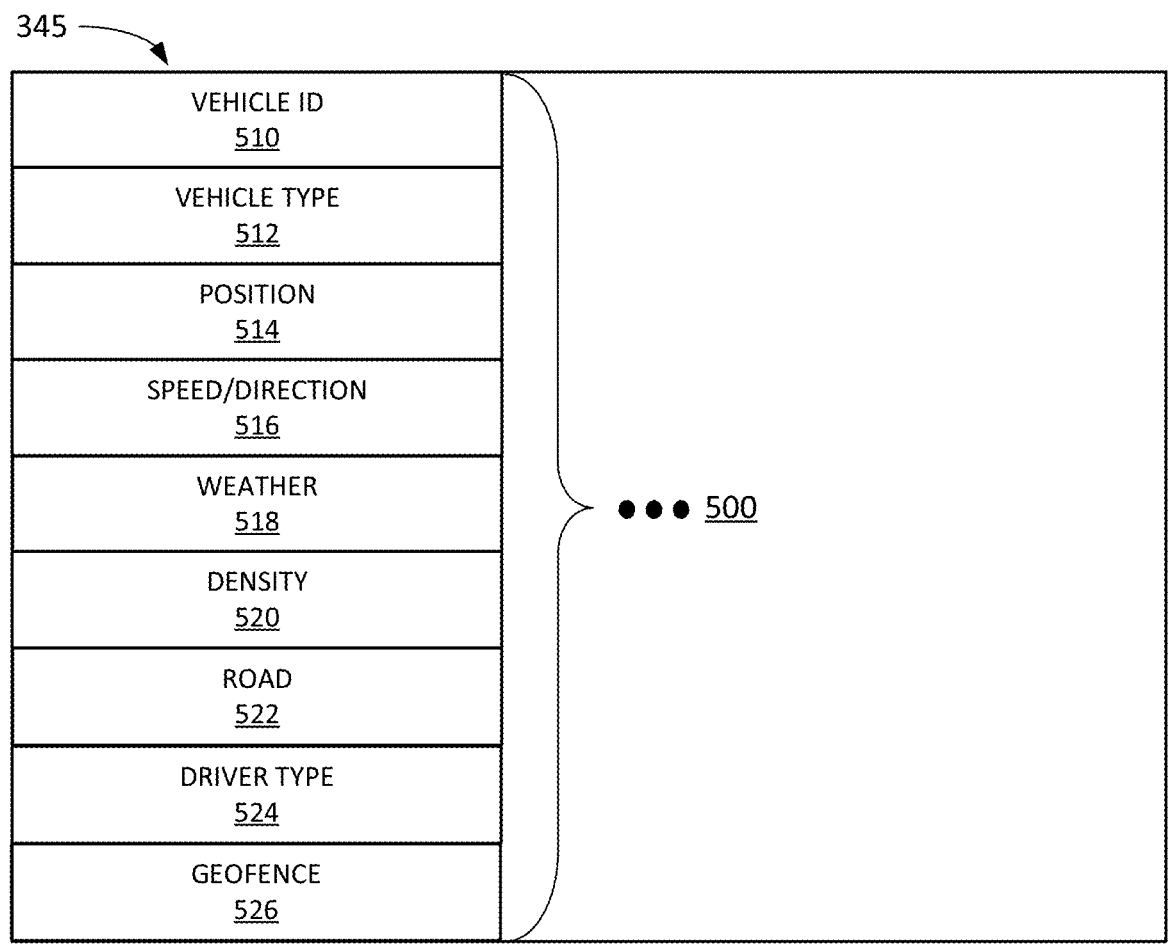
FIG. 5 illustrates exemplary components of the client position database of FIG. 3 according to an implementation described herein.

FIG. 5 illustrates exemplary components of client position DB 345 according to an implementation described herein. As shown in FIG. 5, client position DB 345 may store one or more client records 500. Each client record may correspond to a particular client device. While FIG. 5 is described with respect to client device corresponding to vehicle 110, in other implementations, client device may correspond to another type of device, such as, for example, mobile communication device 120. Client record 500 may include a vehicle ID field 510, a vehicle type field 512 a position field 514, a speed/direction field 516, a weather field 518, a density field 520, a road field 522, a driver field 524, and a geofence field 526.

Vehicle ID field 510 may store a client ID associated with a particular registered client device from client DB 335 that is associated with vehicle 110. The client device may include, for example, vehicle 110, OBD device 112 associated with vehicle 110, and/or mobile communication device 120 associated with vehicle 110. Vehicle type field 512 may store information identifying a vehicle type associated with vehicle 110 (e.g., a sedan, a sports utility vehicle, a van, a truck, a semi-trailer truck, etc.).

Position field 514 may store information identifying a current or last known position for the client device, such as, for example, GPS information, RTK information, a particular intersection, a street, a city block, etc. Speed/direction field 516 may indicate a current or last known speed and direction of the client device.

Weather field 518 may store information identifying a weather condition (e.g., whether there is rain, snow, ice, high wind, glaring sun, etc.) associated with the client device. Density field 520 may store information identifying a vehicle density and/or a pedestrian density associated with the client device. Road field 522 may store information identifying a road condition (e.g., a road incline, a road curvature, a road visibility, etc.). Driver field 524 may store information identifying a driver type (e.g., human driver, autonomous vehicle, student driver, distracted driver, etc.) associated with the client device.

Geofence field 526 may store a dynamic geofence associated with the client device. For example, geofence field 526 may store a center location for the dynamic geofence, a radius and/or another measure of size for the geofence, and/or a shape or boundary for the dynamic geofence.

Although FIG. 5 shows exemplary components of client position DB 345, in other implementations, client position DB 345 may include fewer components, different components, additional components, or differently arranged components than depicted in FIG. 5.

Figure 6:
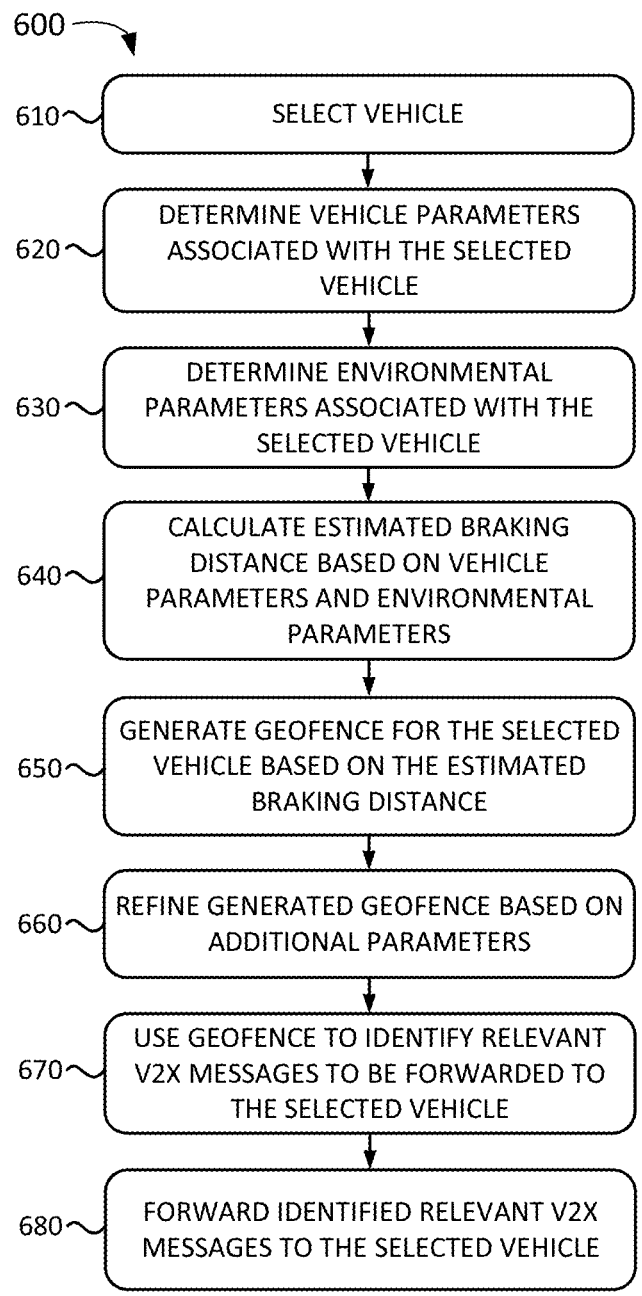
FIG. 6 illustrates a flowchart of a process for generating and using a dynamic geofence according to an implementation described herein.

FIG. 6 illustrates a flowchart of a process for generating and using a dynamic geofence according to an implementation described herein. In some implementations, process 600 of FIG. 6 may be performed by MEC device 145. In other implementations, some or all of process 600 may be performed by another device or a group of devices separate from MEC device 145. The process of FIG. 6 may be repeated for each vehicle registered with V2X object exchange system 300 and each geofence may be dynamically updated at particular time intervals (e.g., every second, every 10 seconds, etc.).

As shown in FIG. 6, process 600 may include selecting a vehicle (block 610). For example, V2X object exchange system 300 may select a vehicle registered in client DB 335 and whose position is monitored and stored in client position DB 345. Process 600 may further include determining vehicle parameters associated with the selected vehicle (block 620). For example, V2X object exchange system 300 may determine the position, speed, and vehicle type associated with the selected vehicle based on information stored in client position DB 345. Furthermore, V2X object exchange system 300 may determine additional vehicle parameters associated with the vehicle, such as the driver type associated with the vehicle.

Process 600 may further include determining environmental parameters associated with the selected vehicle (block 630). For example, V2X object exchange system 300 may determine the time of day, the vehicle density, the pedestrian density, one or more weather parameters, one or more road parameters, and/or other types of environmental parameters associated with the location of the vehicle.

Process 600 may further include calculating an estimated braking distance for the vehicle based on the determined vehicle parameters and environmental parameters (block 640) and generating a geofence for the selected vehicle based on the calculated estimated braking distance (bock 650). As an example, V2X object exchange system 300 may compute a first-order approximation for a minimum size geofence based on $S=\frac{1}{2} gt^2$, where is S is the distance a vehicle will travel during a braking event, known as displacement, where g is the deceleration rate, and where t is the time. Using $V=U+gt$, where V is the final velocity and U is the initial velocity, the time required for a vehicle to come to a stop may be estimated using a deceleration rate based on a size of the vehicle, or based on an average deceleration rate of 3.4 meters per second per second (m/s/s) for vehicles during dry road conditions and an average deceleration rate of 3 m/s/s for vehicles during wet road conditions. Thus, for a vehicle moving at 100 kilometers per hours (kph), or 27.78 m/s, with a deceleration rate of 3 m/s/s, the vehicle would take 8.17 seconds to come to a full stop. Adding 1.5 seconds for the average human reaction time to apply the brakes indicates that the vehicle would travel 141.8 m to come to a full stop. Thus, as a first-order approximation, V2X object exchange system 300 may set a geofence radius of 150 meters for a passenger vehicle traveling at a speed of 100 kph. The first-order approximation may be computed explicitly or by using a first geofence ML model 420. In some implementations, such a first-order approximation may be used while a more detailed geofence is computed using a second geofence ML model 420. The second geofence ML model 420 may use, for example, input described above with respect to FIG. 4B to generate the geofence.

Process 600 may further include refining the generated geofence based on additional parameters (block 660). For example, V2X object exchange system 300 may adjust a shape of the generated geofence based on an intersection, such as by extending the geofence down the sides of an intersecting street, adjust a shape of the generated geofence based on a divided highway by excluding opposing lanes of traffic from the geofence, adjust a shape of the generated geofence based on a pedestrian or bicycle trail that either intersects, or is alongside, a road on which the vehicle is driving, adjust a shape of the generated geofence based on a parking lot, a building, and/or another type of structure, and/or adjust the shape of the generated geofence based on another feature.

Process 600 may further include using the geofence to identify relevant V2X messages to be forwarded to the selected vehicle (block 670) and forwarding the identified relevant V2X messages to the selected vehicle (block 680). As an example, V2X object exchange system 300 may receive object recognition information from camera 122 and generate a BSM or a PSM based on the received object recognition information. As another example, V2X object exchange system 300 may receive an alert message from alert system 175, such as an alert message relating to traffic congestion, vehicle accidents, hazardous road conditions, road construction, road closures, weather events, law enforcement emergencies, and/or other types of alert information, and, in response, generate an RSA message with the alert information. As yet another example, V2X object exchange system 300 may receive a BSM or PSM from RSU 195. As yet another example, V2X object exchange system 300 may receive a BSM or PSM from OBD device 112 or mobile communication device 120. As yet another example, V2X object exchange system 300 may receive a SpaT message from traffic light controller 180 that may include information relating to the status of a traffic light that is out of sight of the driver of the selected vehicle (e.g., over a hill, around a bend, blocked by a tree or large vehicle, etc.). The SpaT message may, for example, provide advance notice that the traffic light will be red by the time the selected vehicle arrives at the traffic light.

The V2X message may include a message ID; a message type such as, for example, a BSM message type, a PSM message type, an EVA message type, a SPaT message type, an RSA message type, a type of BSM message, a type of PSM message, and/or another message type; information identifying a source of the V2X message, such as information identifying a particular vehicle 110, OBD device 112, mobile communication device 120, camera 122, traffic light 124, alert system 175, RSU 195, and/or another type of source device; information identifying a location associated with the particular V2X message, such as GPS information, RTK information, a particular intersection, a street, a city block, etc.; and a message payload that includes, for example, one or more flags indicating a status associated with the source of the particular V2X message, a speed and/or direction associated with the source of the particular V2X message, information indicating a particular type of road hazard, and/or other types of information that may be useful to a recipient of the V2X message.

V2X object exchange system 300 may, for each client device, identify relevant messages for the client device based on the geofence associated with the client device. For each received V2X message, V2X object exchange system 300 may determine whether the location associated with the received V2X message is inside the boundaries of the geofence associated with the client device. If the location associated with the received V2X message is inside the boundaries of the geofence, the V2X message may be designated as relevant to the client device and sent to the client device. Additionally, V2X object exchange system 300 may determine whether the geofence of the client device intersects an alerting geofence. If the geofence associated with the vehicle intersects an alerting geofence, V2X object exchange system 300 may forward an alert message, such as an RSA message or an EVA message, associated with the alerting geofence to the vehicle associated with the geofence.

For example, mobility message service 340 may publish the relevant V2X messages to message broker 320 and message broker 320 may distribute the client-specific V2X messages to RSU proxy 360, OBD proxy 370, and/or UE device interface 380. RSU proxy 360, OBD proxy 370, and/or UE device interface 380 may then transmit the V2X message to specific client devices (e.g., vehicle 110, OBD 112, mobile communication device 120, etc.) via base station 135 using the Uu interface.

Figure 7A:
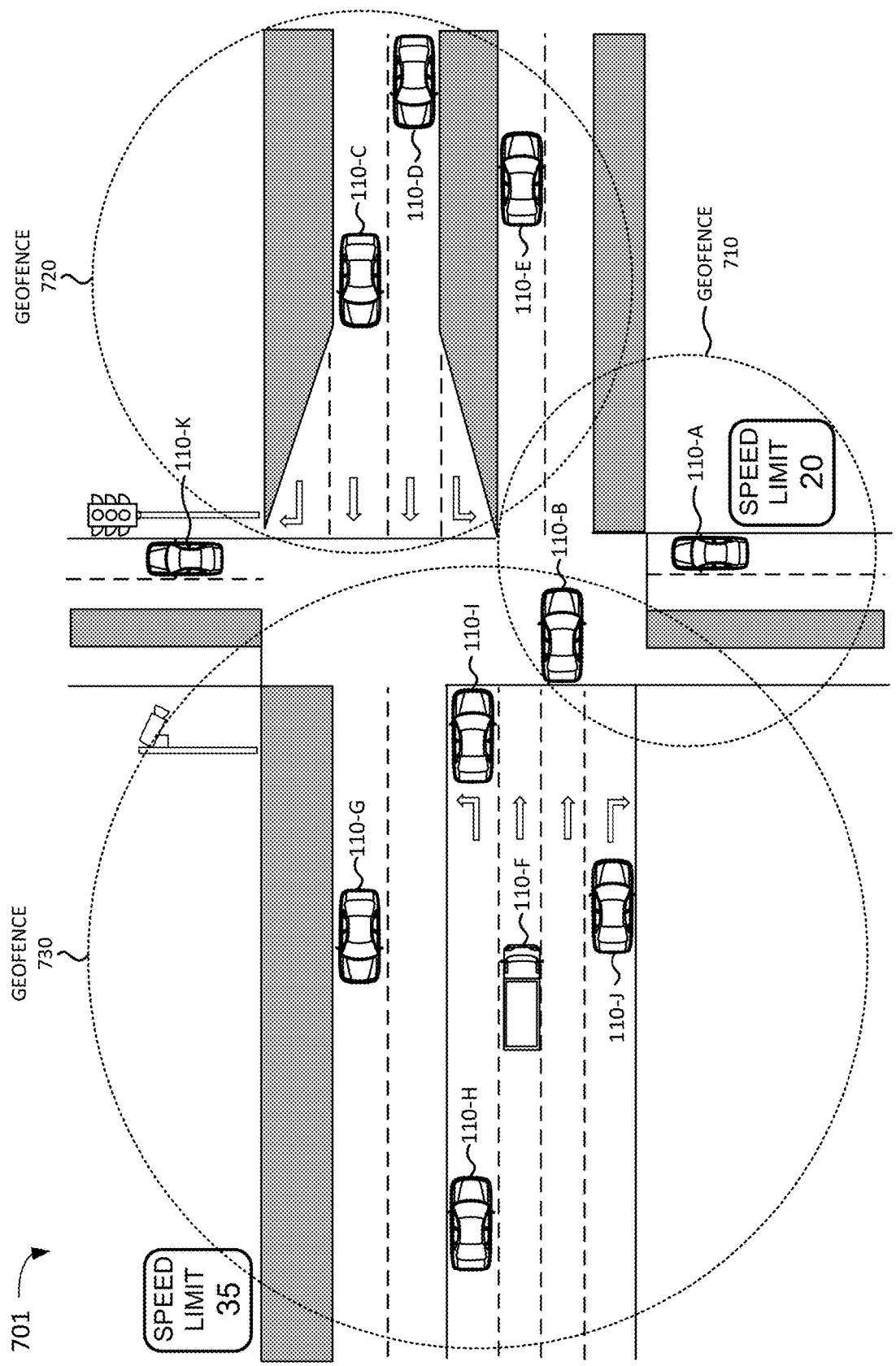
FIG. 7A illustrates a first exemplary geofence scenario according to an implementation described herein.

FIG. 7A illustrates a first exemplary geofence scenario 701 according to an implementation described herein. As shown in FIG. 7A, geofence scenario 701 may include vehicles 110-A, 110-B, 110-C, 110-D, 110-E, 110-F, 110-G, 110-H, 110-I, 110-J, and 110-K. FIG. 7A illustrates geofence 710 generated for vehicle 110-A, geofence 720 generated for vehicle 110-C, and geofence 730 generated for vehicle 110-F. Vehicle 110-A may be traveling at a low speed and thus geofence 710 may have a small radius that encompasses vehicle 110-B. Thus, if vehicle 110-B generates a V2X message, such as a BSM, vehicle 110-A may receive the V2X message from vehicle 110-B.

Vehicle 110-C may be traveling at a faster speed than vehicle 110-A and, therefore, geofence 720 associated with vehicle 110-C may be larger (e.g., have a larger radius) than geofence 710. Geofence 720 may encompass vehicles 110-D and 110-E. Thus, if vehicle 110-D or 110-E generates a V2X message, such as a BSM, vehicle 110-C may receive the V2X message. Vehicle 110-F is a truck, which has a larger weight than vehicle 110-A or vehicle 110-C. Therefore, vehicle 110-F is associated with a greater estimated braking distance than vehicle 110-A or vehicle 110-C and geofence 730, associated with vehicle 10-F, may therefore be larger than geofence 710 or geofence 720. Geofence 730 may encompass vehicles 110-B, 110-G, 110-H, and 10-I. Thus, if vehicle 110-B, 110-G, 110-H, or 110-I generates a V2X message, such as a BSM, vehicle 110-F may receive the V2X message.

Figure 7B:
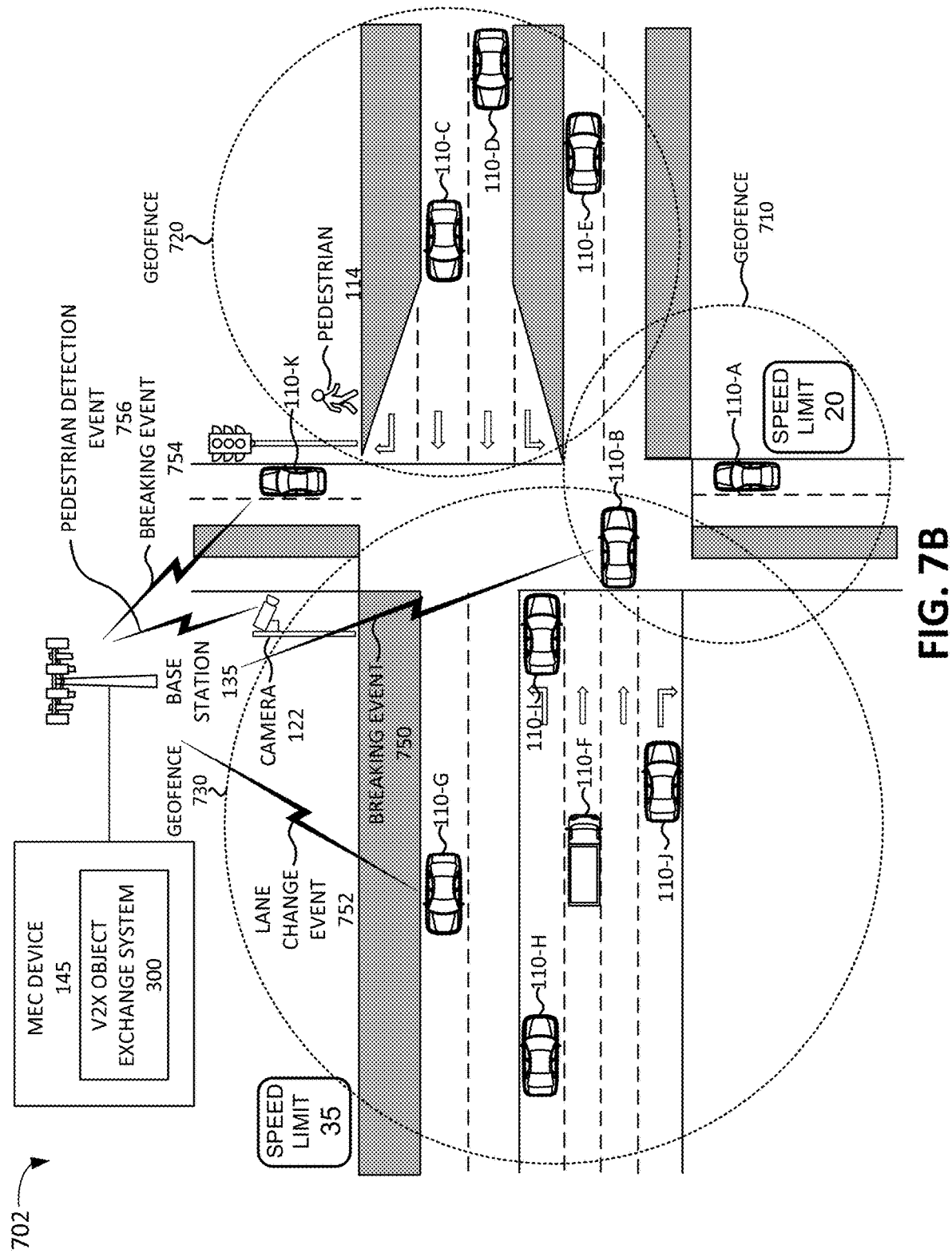
FIGS. 7B and 7C illustrate exemplary signal flows associated with the geofence scenario of FIG. 7A according to an implementation described herein.

FIG. 7B illustrates a first exemplary signal flow 702 associated with geofence scenario 702. As shown in FIG. 7B, during a particular time period, vehicle 110-B may generate a BSM reporting a braking event to V2X object exchange system 300 via base station 135 (signal 750). Furthermore, during the particular time period, vehicle 110-G may generate a BSM reporting a lane change event to V2X object exchange system 300 via base station 135 (signal 752) and vehicle 110-K may generate a BSM reporting a braking event to V2X object exchange system 300 via base station 135 (signal 754). Additionally, camera 122 may detect pedestrian 114 and may send an RSA message to V2X object exchange system 300 via base station 135 (signal 756) indicating the presence of pedestrian 114.

Figure 7C:
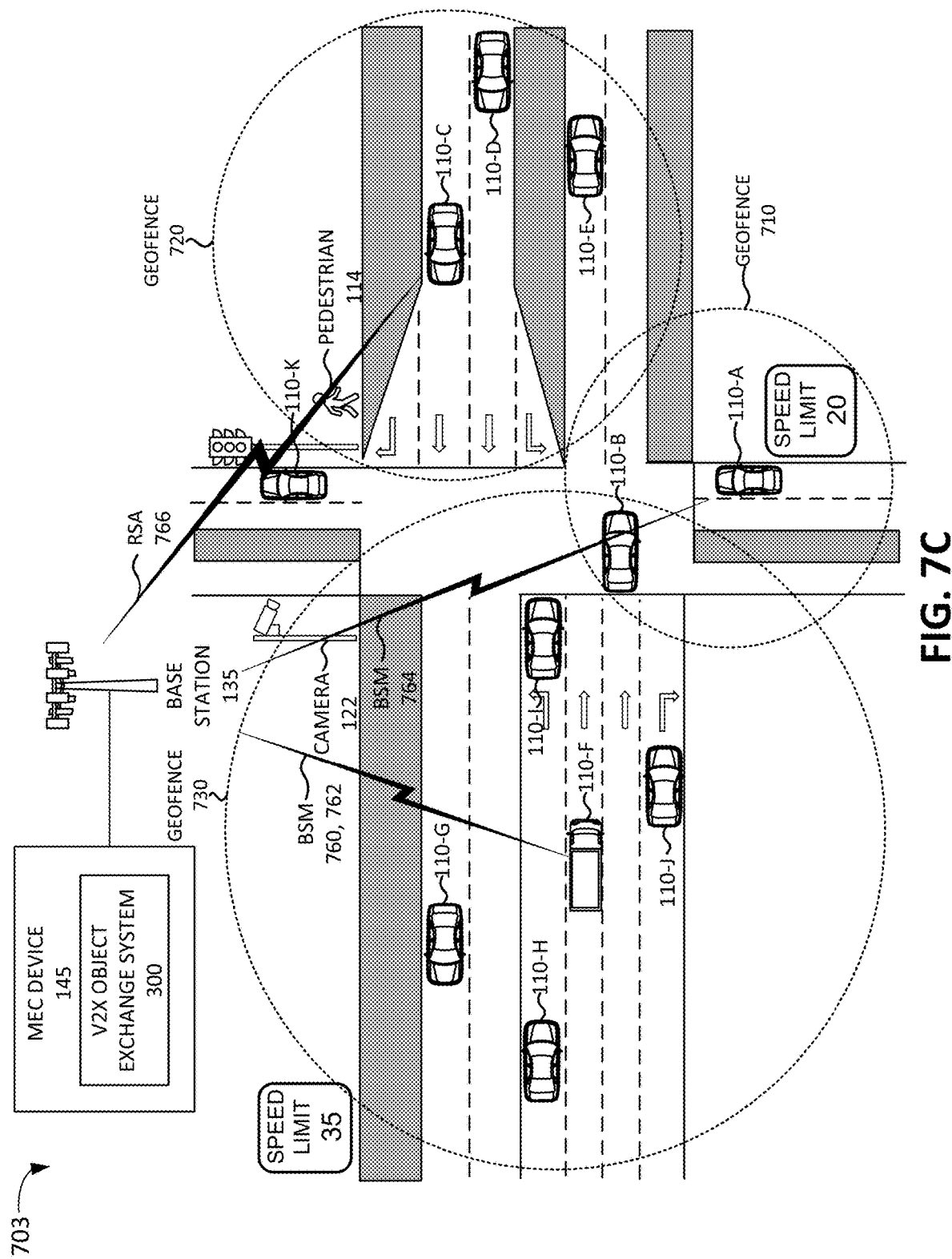

FIG. 7C illustrates a first exemplary signal flow 703 that illustrates how V2X object exchange system 300 processes the signals of geofence scenario 702. As shown in FIG. 7C, V2X object exchange system 300 may identify the BSMs from vehicle 110-B and vehicle 110-G as relevant to vehicle 110-E based on geofence 730 and may forward the BSM to vehicle 110-F (signals 760 and 762). Furthermore, V2X object exchange system 300 may identify the BSM from vehicle 110-B as relevant to vehicle 110-A based on geofence 710 and may forward the BSM to vehicle 110-A (signals 764). Moreover, V2X object exchange system 300 may identify the RSA from camera 122 as relevant to vehicle 110-C based on geofence 720 and may forward the PSM to vehicle 110-C (signals 766).

Figure 8:
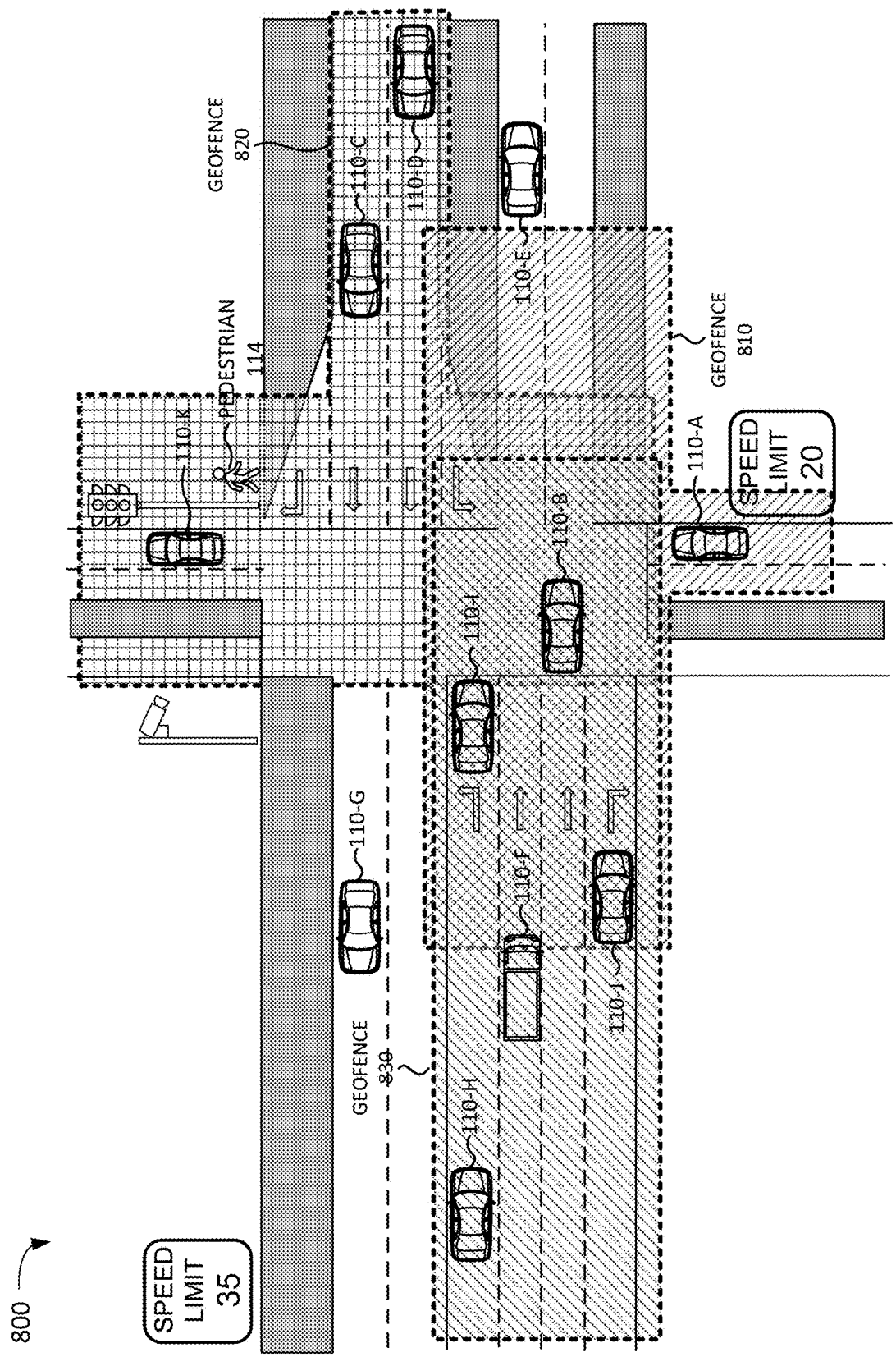
FIG. 8 illustrates a second exemplary geofence scenario according to an implementation described herein.

FIG. 8 illustrates a second exemplary geofence scenario 800 according to an implementation described herein. As shown in FIG. 8, geofences generated by V2X object exchange system 300 may be refined based on map information. Geofence 710 from FIG. 7A may be refined into geofence 810. Geofence 810, generated for vehicle 110-A, may extend into the intersection and enable vehicle 110-A to receive messages from vehicles approaching the intersection. Geofence 810 may encompass vehicles 110-B, 110-I, and 110-J. Thus, if vehicle 110-B, 110-I, or 110-J generates a V2X message, such as a BSM, vehicle 110-A may receive the V2X message.

Geofence 820, generated for vehicle 110-C, may also extend into the intersection. Furthermore, V2X object exchange system 300 may determine that vehicle 110-C is driving on a divided highway and may select to exclude the lanes of the divided highway where vehicles are driving in the opposite direction, such as vehicle 110-E, as the median of the divided highway may make the danger of a collision with vehicle 110-E unlikely. Therefore, geofence 820 may encompass vehicles 110-B, 110-D, and 110-K, as well as pedestrian 114. Thus, if vehicle 110-B, 110-D, or 110-K generates a V2X message, such as a BSM, or if a PSM associated with pedestrian 114 is generated, vehicle 110-C may receive the V2X message.

Geofence 830, generated for vehicle 110-F may extend into and across the intersection due to a longer estimated braking distance for vehicle 110-F. Geofence 830 may encompass vehicles 110-B, 110-H, 110-I, and 110-J. Thus, if vehicle 110-B, 110-H, 110-I, or 110-J generates a V2X message, such as a BSM, vehicle 110-F may receive the V2X message.

Figure 9:
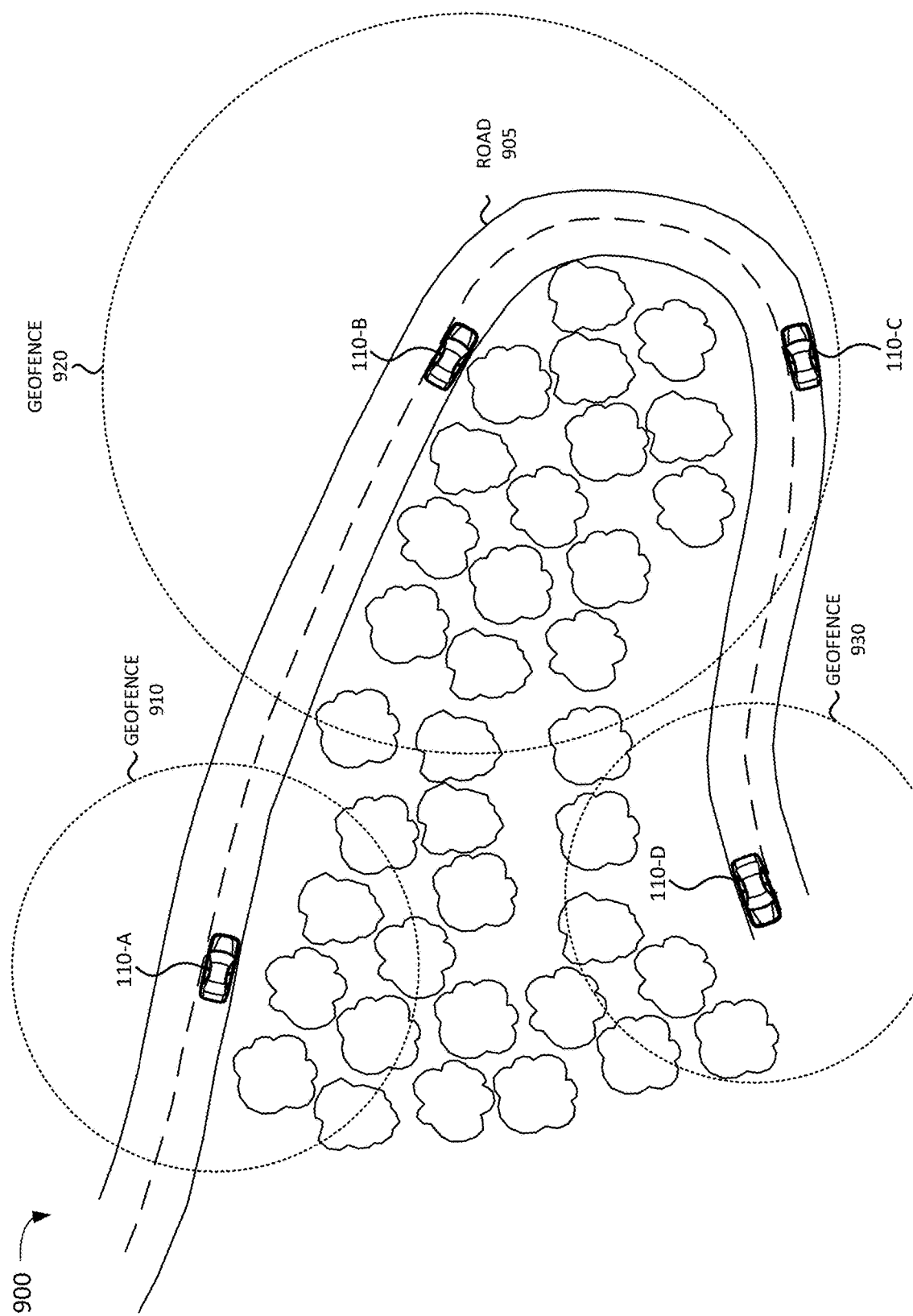
FIG. 9 illustrates a third exemplary geofence scenario according to an implementation described herein.

FIG. 9 illustrates a third exemplary geofence scenario 900 according to an implementation described herein. As shown in FIG. 9, road 905 may include an area of sharp curvature where visibility is obscured by trees. Therefore, V2X object exchange system 300 may generate a road parameter for the area of the sharp curvature that increases the size of a geofence for vehicles in the area. Thus, vehicle 110-A may be associated with geofence 910. When the vehicle approaches the area, the geofence size may be increased even though a vehicle may slow down as it approaches the curve, as shown by vehicle 110-B and geofence 920 associated with vehicle 110-B. Thus, vehicle 110-B may receive BSM messages from a vehicle around the curve, such as vehicle 110-C, while in the area of the sharp curvature. As a vehicle leaves the area of the sharp curvature, the geofence size may be reduced to the previous size, as shown by vehicle 110-D and geofence 930 associated with vehicle 110-D.

In some implementations, V2X object exchange system 300 may designate particular areas, associated with a set of road parameters, as a danger area. In a danger area, such as the area of sharp curvature shown in FIG. 9, V2X object exchange system 300 may generate an alerting geofence for any vehicles that enter the danger area. When vehicle 110-C enter the area of sharp curvature, V2X object exchange system 300 may generate an alerting geofence around vehicle 110-C (not shown in FIG. 9). Then, when geofence 920 of vehicle 110-B encounters the alerting geofence of vehicle 110-C, V2X object exchange system 300 may send a BSM to vehicle 110-B, informing vehicle 110-B of the presence of vehicle 110-C, even though vehicle 110-C did not generate a BSM.

Figure 10:
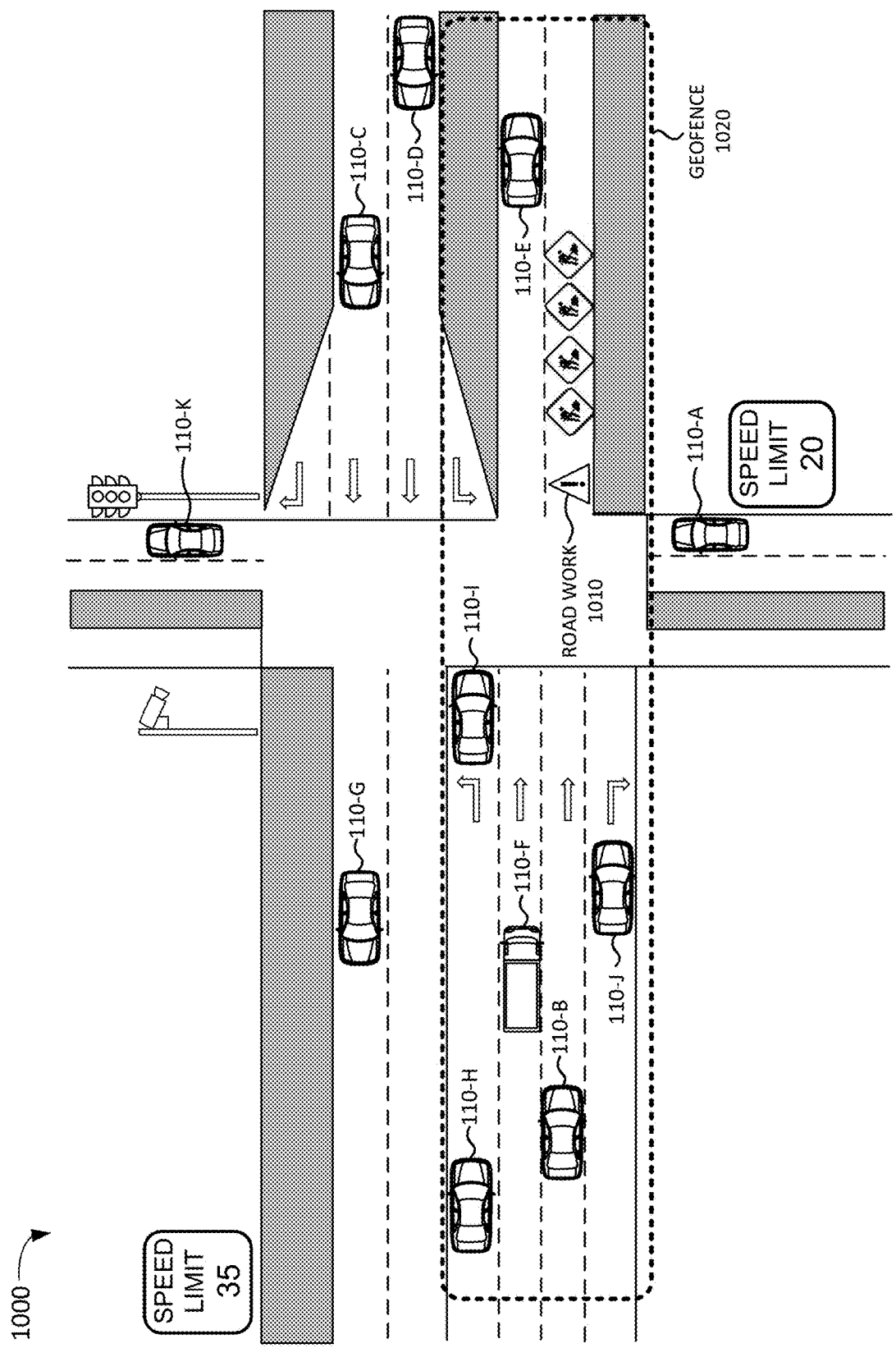
FIG. 10 illustrates a fourth exemplary geofence scenario according to an implementation described herein.

FIG. 10 illustrates a fourth exemplary geofence scenario 1000 according to an implementation described herein. As shown in FIG. 10, geofence scenario 1000 may include a roadwork area 1010. V2X object exchange system 300 may generate an alerting geofence 1020 around roadwork area 1010. Any vehicle that enters the area encompassed by alerting geofence 1020, such as vehicles 110-B, 110-E, 110-F, 110-H, 110-I, and 110-J, may receive an RSA message from V2X object exchange system 300, alerting each vehicle to the presence of roadwork area 1010.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signals has been described with respect to FIGS. 7B and 7C, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   selecting, by a device, a vehicle attached to a base station;
   determining, by the device, a speed and a vehicle type associated with the vehicle;
   calculating, by the device, an estimated braking distance for the vehicle based on the speed and the vehicle type;
   generating, by the device, a geofence for the vehicle based on the calculated estimated braking distance;
   using, by the device, the generated geofence to identify at least one relevant Vehicle-to-Everything (V2X) message to be forwarded to the vehicle; and
   forwarding, by the device, the identified at least one relevant V2X message to the vehicle via the base station.

2. The method of claim 1, further comprising:
   determining a weather condition associated with the vehicle; and
   wherein generating the geofence for the vehicle is further based on the determined weather condition associated with the vehicle.

3. The method of claim 1, further comprising:
   determining a road parameter associated with the vehicle; and
   wherein generating the geofence for the vehicle is further based on the determined road parameter associated with the vehicle.

4. The method of claim 3, wherein the road parameter includes at least one of a road incline, a road curvature, or a road visibility.

5. The method of claim 1, further comprising:
   determining at least one of a vehicle density or a pedestrian density for a location associated with the vehicle; and
   wherein generating the geofence for the vehicle is further based on the determined at least one of the vehicle density or the pedestrian density for the location associated with the vehicle.

6. The method of claim 1, further comprising:
   determining a driver type associated with the vehicle; and
   wherein generating the geofence for the vehicle is further based on the determined driver type associated with the vehicle.

7. The method of claim 1, further comprising:
   refining the generated geofence based on a map of an area associated with the vehicle.

8. The method of claim 7, wherein refining the generated geofence includes adjusting a shape of the generated geofence based on presence of at least one of an intersection, a divided highway, a pedestrian or bicycle trail, a parking lot, or a building.

9. The method of claim 1, further comprising:
   determining that the generated geofence intersects an alerting geofence; and
   forwarding a message associated with the alerting geofence to the vehicle, in response to determining that the generated geofence intersects the alerting geofence.

10. The method of claim 9, wherein the alerting geofence is associated with at least one of an emergency vehicle, a roadwork site, a school zone, or a hospital.

11. The method of claim 1, wherein calculating the estimated braking distance for the vehicle based on the determined speed and the determined vehicle type is performed using a machine learning model trained to predict the estimated braking distance based on a plurality of vehicle parameters and a plurality of environmental parameters.

12. The method of claim 1, wherein the identified at least one relevant V2X message includes:
   a Basic Safety Message (BSM) type;
   a Personal Safety Message (PSM) type;
   a Roadside Alert (RSA) message type;
   a Signal Phase and Timing (SpaT) message type; or
   an Emergency Vehicle Alert (EVA) message type.

13. A device comprising:
   a memory storing instructions; and
   a processor configured to execute the instructions to:
      select a vehicle attached to a base station;
      determine a speed and a vehicle type associated with the vehicle;
      calculate an estimated braking distance for the vehicle based on the speed and the vehicle type;
      generate a geofence for the vehicle based on the calculated estimated braking distance;
      use the generated geofence to identify at least one relevant Vehicle-to-Everything (V2X) message to be forwarded to the vehicle; and
      forward the identified at least one relevant V2X message to the vehicle via the base station.

14. The device of claim 13, wherein the processor is further configured to:
   determine at least one of a weather condition, a road parameter, a driver type, a vehicle density, or a pedestrian density associated with the vehicle; and
   wherein when the processor generates the geofence for the vehicle, the processor generates the geofence further based on the determined at least one of the weather condition, the road parameter, the driver type, the vehicle density, or the pedestrian density associated with the vehicle.

15. The device of claim 14, wherein the determined at least one of the weather condition, the road parameter, the driver type, the vehicle density, or the pedestrian density associated with the vehicle includes the road parameter, and wherein the road parameter includes at least one of a road incline, a road curvature, or a road visibility.

16. The device of claim 13, wherein the processor is further configured to:
   refine the generated geofence based on a map of an area associated with the vehicle.

17. The device of claim 16, wherein, when refining the generated geofence, the processor is further configured to:
   adjust a shape of the generated geofence based on presence of at least one of an intersection, a divided highway, a pedestrian or bicycle trail, a parking lot, or a building.

18. The device of claim 13, wherein the processor is further configured to:
   determine that the generated geofence intersects an alerting geofence; and
   forward a message associated with the alerting geofence to the vehicle, in response to determining that the generated geofence intersects the alerting geofence.

19. The device of claim 18, wherein the alerting geofence is associated with at least one of an emergency vehicle, a roadwork site, a school zone, or a hospital.

20. A system comprising:
   a base station configured to communicate with a plurality of vehicles; and
   a Multi-Access Edge Computing (MEC) device configured to:
      select a vehicle, attached to the base station, from the plurality of vehicles;
      determine a speed and a vehicle type associated with the vehicle;
      calculate an estimated braking distance for the vehicle based on the speed and the vehicle type;
      generate a geofence for the vehicle based on the calculated estimated braking distance;
      use the generated geofence to identify at least one relevant Vehicle-to-Everything (V2X) message to be forwarded to the vehicle; and
      forward the identified at least one relevant V2X message to the vehicle via the base station.

\* \* \* \* \*